United States Patent [19]

Repp et al.

[11] Patent Number: 5,704,173
[45] Date of Patent: Jan. 6, 1998

[54] HINGED WINDOW ASSEMBLY

[75] Inventors: R. Scott Repp, Holland; Pamela M. Stallman, Lawton, both of Mich.

[73] Assignee: Donnelly Corporation, Holland, Mich.

[21] Appl. No.: 659,269

[22] Filed: Jun. 6, 1996

Related U.S. Application Data

[63] Continuation of Ser. No. 129,671, Sep. 30, 1993, Pat. No. 5,551,197.

[51] Int. Cl.[6] .................................. E05D 7/00; B60J 1/00
[52] U.S. Cl. .............................. 52/204.62; 52/204.69; 52/208; 296/201; 156/108
[58] Field of Search ........................... 52/204.62, 204.64, 52/204.66, 204.69; 156/108, 99, 107; 296/146.1, 146.15, 84.1, 145.15, 145.16, 201; 16/DIG. 40, 42, 382

[56] References Cited

U.S. PATENT DOCUMENTS

| | | |
|---|---|---|
| 226,770 | 4/1880 | Morse . |
| 1,963,941 | 6/1934 | Duffy . |
| 2,502,970 | 4/1950 | Manning . |
| 2,507,965 | 5/1950 | Eichner . |
| 2,555,204 | 5/1951 | Sorrell . |
| 2,592,411 | 4/1952 | Frohnapel . |
| 2,608,926 | 9/1952 | Helsley . |
| 2,617,481 | 11/1952 | Frohnapel . |
| 2,679,201 | 5/1954 | Scharmen . |
| 2,738,838 | 3/1956 | Sutter . |
| 2,829,081 | 4/1958 | Sween . |
| 2,948,015 | 8/1960 | Hansen . |
| 3,032,808 | 5/1962 | Fleming . |
| 3,052,496 | 9/1962 | Frey . |
| 3,343,867 | 9/1967 | Couch et al. . |
| 3,448,486 | 6/1969 | Wright ........................ 16/382 |
| 3,713,578 | 1/1973 | Johnson . |
| 3,806,188 | 4/1974 | Tantlinger . |
| 3,827,184 | 8/1974 | Pennec et al. . |
| 3,837,984 | 9/1974 | Wagner et al. . |
| 3,881,303 | 5/1975 | Krafka et al. . |
| 3,885,072 | 5/1975 | Zibritosky . |
| 3,916,055 | 10/1975 | Wagner . |

(List continued on next page.)

FOREIGN PATENT DOCUMENTS

| | | |
|---|---|---|
| 289156A1 | 11/1988 | European Pat. Off. . |
| 526327A1 | 2/1993 | European Pat. Off. . |
| 1902498 | 8/1970 | Germany ........................ 16/382 |
| 3925804A1 | 8/1990 | Germany . |
| 4113816 | 11/1991 | Germany . |
| 1122722 | 5/1989 | Japan . |
| 2258844 | 10/1990 | Japan . |
| 3070626 | 3/1991 | Japan . |
| 3236922 | 10/1991 | Japan . |

OTHER PUBLICATIONS

SAE Technical Paper 900519, Feb. 26, 1990.
SAE Technical Paper 910758, Feb. 25, 1991.
Photographs A–G of General Motors G300 station wagon quarter window with hinged vent on sale or used by others more than one (1) year prior to Sep. 30, 1993.

*Primary Examiner*—Wynn E. Wood
*Attorney, Agent, or Firm*—Van Dyke, Gardner, Linn & Burkhart, LLP

[57] ABSTRACT

A flush-mounted articulated window assembly for use in a vehicle, the window assembly adapted to be mounted in a window opening such that, when closed, it is generally flush with the exterior surface of the vehicle. The window assembly includes a transparent sheet with at least one window-mounting member bonded by two separate adhesives to an inner surface of the sheet. The mounting member includes projections which space the mounting member from the inner sheet surface, and/or perforations which allow air and moisture to reach the space provided between the mounting member and the inner sheet surface. A first adhesive temporarily fixtures the mounting member to the sheet. A second adhesive permanently bonds the mounting member to the inner sheet surface. The bond created is sufficiently strong such that application of a load sufficient to cause a failure results in a failure other than in the adhesion of the adhesive to the mounting member and the panel.

25 Claims, 4 Drawing Sheets

U.S. PATENT DOCUMENTS

| | | | |
|---|---|---|---|
| 4,067,605 | 1/1978 | Green et al. | |
| 4,093,304 | 6/1978 | Ziegler. | |
| 4,139,234 | 2/1979 | Morgan. | |
| 4,167,259 | 9/1979 | Bury. | |
| 4,243,262 | 1/1981 | Tokunaga et al. | 296/146.15 |
| 4,274,901 | 6/1981 | Elber. | |
| 4,296,961 | 10/1981 | Hunt et al. | |
| 4,363,191 | 12/1982 | Morgan. | |
| 4,364,214 | 12/1982 | Morgan et al. | |
| 4,364,595 | 12/1982 | Morgan et al. | 296/146.15 X |
| 4,396,221 | 8/1983 | Morgan et al. | |
| 4,433,930 | 2/1984 | Cosenza. | |
| 4,511,129 | 4/1985 | Kishimo | 296/146.16 |
| 4,534,587 | 8/1985 | Fleming. | |
| 4,606,159 | 8/1986 | Kunert. | |
| 4,625,459 | 12/1986 | Warner. | |
| 4,651,382 | 3/1987 | Krolick | 16/124 |
| 4,700,525 | 10/1987 | Nieboer et al. | |
| 4,712,341 | 12/1987 | Harris, Jr. et al. | |
| 4,723,809 | 2/1988 | Kida et al. | |
| 4,761,916 | 8/1988 | Sanok et al. | |
| 4,777,699 | 10/1988 | Hill et al. | |
| 4,778,702 | 10/1988 | Hutter, III. | |
| 4,793,886 | 12/1988 | Okamura et al. | |
| 4,799,344 | 1/1989 | Francis. | |
| 4,822,656 | 4/1989 | Hutter, III. | |
| 4,841,698 | 6/1989 | Gold. | |
| 4,861,540 | 8/1989 | Nieboer et al. | |
| 4,923,232 | 5/1990 | Kawagoe et al. | |
| 4,925,237 | 5/1990 | Böhm et al. | |
| 4,951,907 | 8/1990 | Gold. | |
| 4,986,595 | 1/1991 | Gold. | |
| 5,046,284 | 9/1991 | Harper | 296/146.15 X |
| 5,050,928 | 9/1991 | Böhm et al. | |
| 5,062,248 | 11/1991 | Kunert. | |
| 5,064,494 | 11/1991 | Duck et al. | |
| 5,076,637 | 12/1991 | Larkin et al. | 296/146.16 X |
| 5,096,255 | 3/1992 | Leischner | 296/201 |
| 5,154,028 | 10/1992 | Hill et al. | |
| 5,231,948 | 8/1993 | Malmanger et al. | |
| 5,242,518 | 9/1993 | Riederer | 156/108 X |
| 5,261,721 | 11/1993 | Conger et al. | |
| 5,299,616 | 4/1994 | Sholtz | 296/146.16 X |
| 5,544,458 | 8/1996 | Fisher et al. | 52/204.62 X |

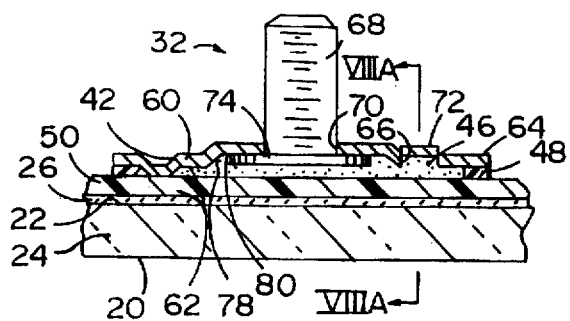
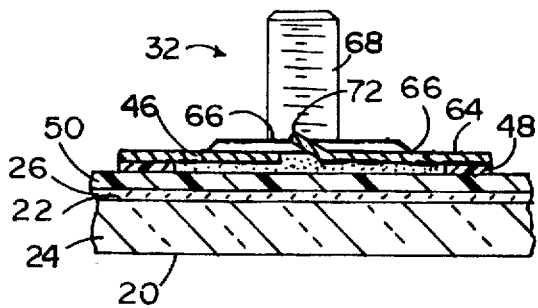
FIG. 8    FIG. 8A
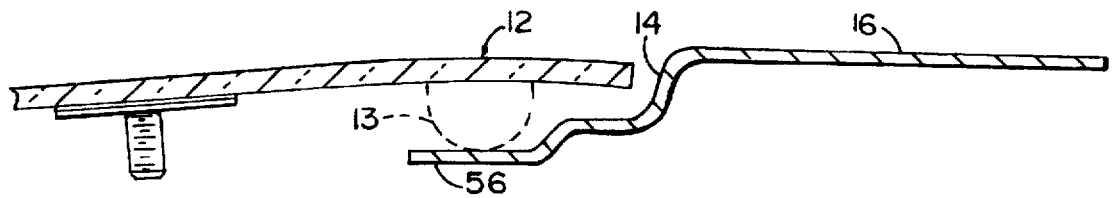
FIG. 9
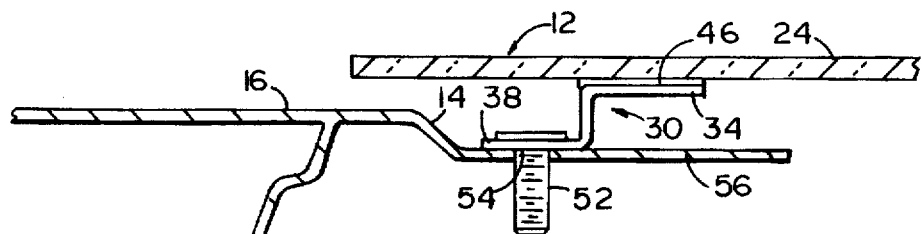
FIG. 10
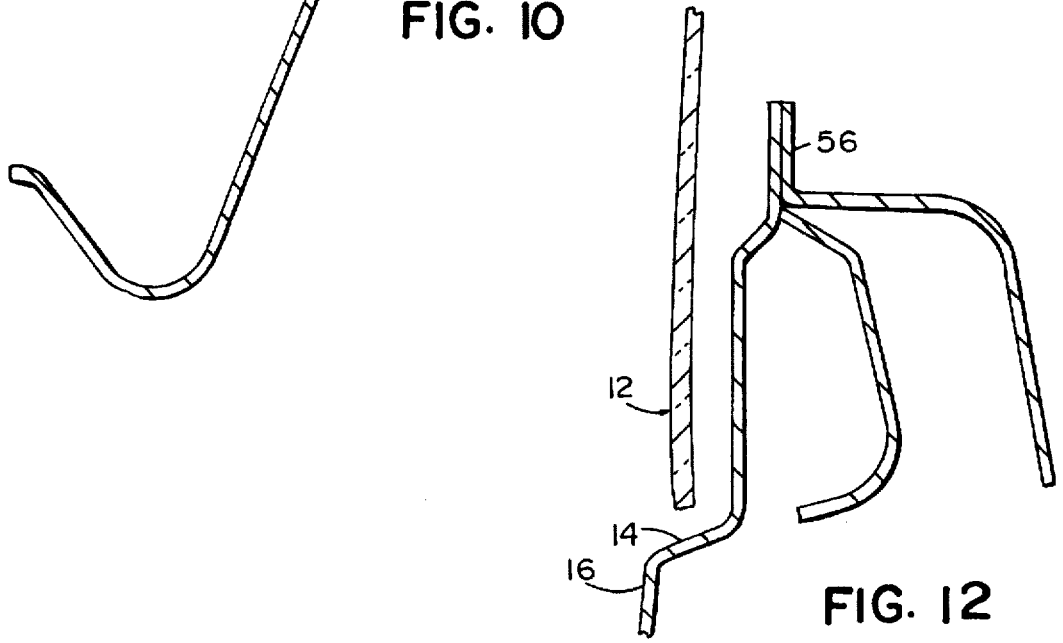
FIG. 12

HINGED WINDOW ASSEMBLY

CROSS REFERENCE TO RELATED APPLICATION

This application is a continuation of prior application Ser. No. 08/129,671, filed Sep. 30, 1993, now issued as U.S. Pat. No. 5,551,197.

FIELD OF THE INVENTION

This invention relates generally to flush-mounted window assemblies for vehicles and more particularly, to flush-mounted vehicular window assemblies which articulate about a hinge attached to one side of the window in a manner to achieve long-term reliability.

BACKGROUND OF THE INVENTION

In an effort to make automobiles more fuel-efficient, automobile exterior designs are becoming more streamlined. To achieve this goal, automobile manufacturers are requiring flush-mounted panel and window assemblies. The goal is to locate the panel or window within the vehicle such that the peripheral edge of the panel or window assembly is recessed and the outer surface of the panel is generally flush with any adjoining body panels. In the case of fixed panels, a conventional technique includes placing or running a bead of adhesive material around the entire inside peripheral edge of the panel and bonding it in the vehicle opening. While satisfactory for stationary windows, this method creates problems with movable windows, however, particularly those which articulate about a hinge.

Conventional articulated or hinged windows are fixed to the vehicle by a mounting assembly which is fastened by a stud passing through a hole drilled in the panel. A low profile nut is then threaded onto the stud extending through the panel to retain the panel thereon. A major disadvantage is that a significant number of glass panels are broken as a result of drilling the holes through the panel. The panels are also broken during or after mounting of the mounting hardware. To avoid the breakage of the glass panel, sophisticated techniques have been adopted to drill the holes, and the mounting hardware has been adapted to reduce breakage. As a result, the price of such panel assemblies is unnecessarily high. Moreover, the resulting panel is not truly flush since the mounting hardware has a positive relief with respect to the panel exterior surface.

Another attempt to reduce the exterior profile of articulated window assemblies is disclosed in U.S. Pat. No. 4,396,221 which employs a channel extending around the edge of the window pane, a flexible resilient portion allowing pivotal movement of the window pane, and one of several types of fasteners. Such fasteners include a clip with a detent received in the seal and securing the hinge and thus the assembly to a pinch weld flange.

Another embodiment of the hinged window assembly just described includes a substantially rectilinear hinge member which includes a retaining end bonded to the exterior or front surface of the window panel by an adhesive and an opposing retaining end having an aperture which receives a metal screw extending into the vehicle body. Seated on the pinch-weld flange is a sealing weather strip which forms a closed bulbous portion engaging both the inside surface of the pane as well as a shoulder of the recess leading to the pinch weld flange on the exterior sheet metal body portion. To conceal the fastener for the hinge, a metal covering extending from the vehicle roof or another portion of the vehicle may extend over the fastener and a substantial portion of the hinge.

A disadvantage associated with each of the above hinged windows is that the hinge member is fixed to the exterior surface of the panel. In addition, in the last embodiment described above, the fastener securing the assembly to the vehicle is exposed, or must include a special cover member. Accordingly, the exterior profile of these window assemblies do not result in a truly flush-mounted, articulated window assembly.

Although known in the art to adhesively bond metal to glass for a variety of purposes such as stud attachments, small hinge plates, etc., known hinge adhesives and hinge designs are inadequate to meet load requirements and long-term environmental resilience required for flush-mounted, hinged window assemblies. Hinge mounting of large size, flush-mounted panels in the nature of van windows is a demanding application of adhesive technology. The higher weight of such a window transmits more severe vibration requiring greater strength and greater long-term environmental resilience and durability than is available with such prior known bonds. Styling and design limitations restrict the number of hinges and the size of the bond areas.

Accordingly, there is now a need for large panels such as van or tailgate windows having a flush mounted hinge, and an improved bond between a hinge member and the single panel surface to which it is attached to support the panel.

SUMMARY OF THE INVENTION

The present invention includes a unique articulated window assembly especially for vehicles, and a method for manufacturing the panel assembly.

The panel assembly of this invention is especially useful as a flush-mounted vehicle window assembly, and includes, in combination, a panel having inner and outer surfaces which terminate in a peripheral edge and give the panel a predetermined geometric shape. At least one mounting member is secured to the inner surface of the panel and spaced from the peripheral edge. An adhesive is used to bond a flange of the mounting member to the inner surface of the panel. The resulting bond between the mounting member flange and the panel is sufficiently strong such that when a load sufficient to induce failure is imposed between the mounting member and the panel, failure of the panel assembly results other than in the adhesion of the adhesive to the mounting member or panel. More specifically, failure may occur as cohesive failure of the adhesive, mechanical failure of the mounting member adjacent the adhesive, or mechanical failure of the panel adjacent the adhesive. The bond is preferably strong enough to withstand a failure load of at least 150 pounds.

One embodiment of the invention includes an articulated window assembly for use in a vehicle wherein the window assembly is mounted in the window opening from the inner surface with the opposite surface generally flush with the exterior surface of the vehicle. The articulated window assembly includes, in combination, a transparent sheet having inner and outer surfaces terminating in a peripheral edge and defining a shape to fit within the window opening. At least one window-mounting member is bonded to the inner surface of the sheet at a position spaced inwardly from the peripheral edge and fixing the sheet in the window opening. The mounting member may include a plurality of projections extending therefrom for spacing the mounting member from the inner surface of the sheet by a predetermined distance. One or more adhesives are provided between the inner surface of the sheet and the mounting member for bonding the sheet and mounting member together in such a manner that when tested under a straight pull test of more than 150 pounds applied at a rate greater than 25 millimeters per minute, failure will occur generally in the sheet, the mounting member or the cohesiveness of the adhesive will fail, but the adhesion of the adhesive to the sheet or mounting member will not fail. Such strength is also maintained after soaking in 80° C. water for at least 100 hours.

Another embodiment of the invention includes a hinged window panel having a shape to fit within the window opening of a vehicle with an outer surface of the peripheral edge aligned generally flush with an outer surface of the window opening. At least one hinge assembly includes a flange portion which is located on the inner surface of the panel inwardly from the peripheral edge and a hinged portion for engaging the window opening. At least one latch-mounting member is provided having a base portion located on the inner surface of the panel inwardly from the peripheral edge and spaced from the hinge assembly. The latch-mounting member also includes an end portion to receive a latch interconnected to the inside of the window opening. A first adhesive is optionally provided having a quick set-up time, for temporarily fixturing the hinge assembly and the latch-mounting member to file the inner surface of the panel. A second adhesive is then provided for permanently bonding the hinge assembly and latch member to the inner surface of the panel and has a set-up or cure time greater than the first adhesive.

According to additional aspects of the invention, the panel or transparent sheet may further include an opaque coating such as a ceramic frit between the inner surface of the panel and the adhesive bonding the mounting member, hinge or latch member, to the panel. An adhesion-promoting compound may also be applied to the opaque coating, mounting member, hinge or latch-mounting member, to enhance the bond with the adhesive.

The panel assemblies of this invention have advantages over the prior art in that the mounting members do not need to be fixed by holes drilled through the panel yet provide a strong and resilient bond between the panel and the vehicle. Another advantage is that the mounting members no longer wrap around the exterior edge of the window panel or are exposed on the exterior of the window panel. Moreover, the panel assembly of this invention may be manufactured rapidly without complex machines, and is highly adapted for support of larger sized, heavier windows in vehicles in which significant vibration is encountered. Because the mounting members are fixed to the panel by an adhesive, fewer panels are broken during the manufacturing process. A still further advantage of the panel assembly of this invention is that the mounting members do not extend through and protrude from the panel, but are concealed on the inner surface of the panel which results in a flush, more streamlined and aesthetically pleasing panel assembly appearance.

The above advantages, purposes and other features of the invention will become apparent from a study of the following detailed description taken in conjunction with the appended drawing figures.

BRIEF DESCRIPTION OF THE DRAWING FIGURES

FIG. 8 is a fragmentary sectional view of the panel assembly and mounting stud taken along line VIII—VIII in FIG. 7;

FIG. 8A is a fragmentary sectional view of the panel assembly and mounting stud taken along line VIIIA—VIIIA in FIG. 8;

FIG. 9 is a fragmentary sectional view of the panel assembly in a closed position on a vehicle and taken along line IX—IX in FIG. 1;

FIG. 10 is a fragmentary sectional view of the panel assembly on a vehicle and taken along line X—X in FIG. 1;

FIG. 12 is a fragmentary sectional view of the panel assembly on a vehicle and taken along line XII—XII in FIG. 1;

DETAILED DESCRIPTION OF THE PREFERRED EMBODIMENTS

Figure 1:
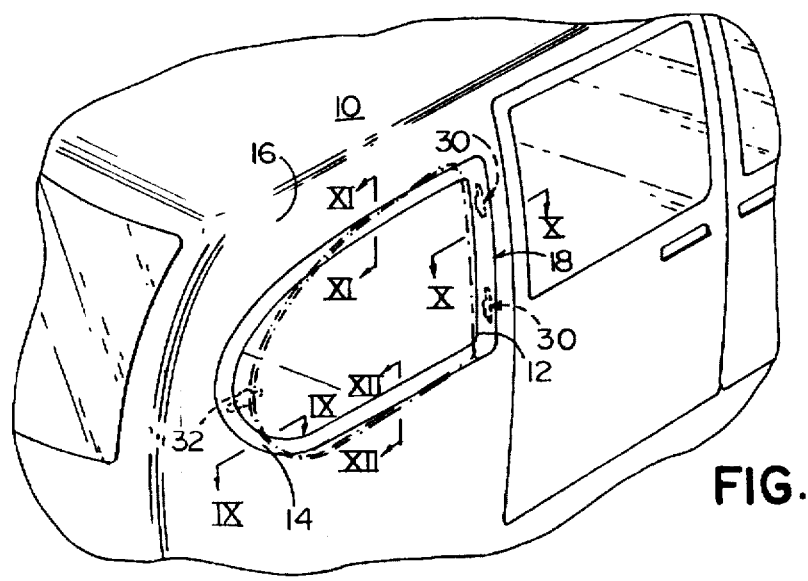
FIG. 1 is a fragmentary perspective view of the articulated panel assembly of this invention mounted as a side window in a vehicle.

Although this invention relates to flush-mounted articulated window panels for vehicles, the advantages of this invention are best realized in large flush-mounted articulated window panels such as used in side windows for vans, rear lift gate windows for vans, station wagons, utility vehicles, and trucks, and other vehicles such as aeronautical, nautical, rail, and other forms of transportation, which exerts substantial loads on the bonds between the mounting hardware and the window panel. such window panels have surface areas typically greater than 250 square inches.

Referring now to the drawings in greater detail, panel assembly 12 of the present invention is disposed on a vehicle 10 within a window opening 14 formed in the vehicle exterior 16. Panel or window assembly 12 is adapted to articulate or pivot about a pair of mounting members 30 (FIGS. 3–6) positioned proximate peripheral edge 18 of inside surface 22. Panel assembly 12 is opened or closed about mounting members 30 by a second mounting member 32 (FIGS. 2–3) interconnecting the vehicle 10 to a second portion of panel assembly 12 distant and spaced from mounting members 30. Although panel assembly 12 is shown pivoting about an axis proximate the leading peripheral edge 18, it is contemplated that this invention may also be used to articulate panels such as a rear window or tailgate window about a horizontal axis as well.

In one embodiment, panel assembly 12 includes a panel or sheet 24 having outer and inner surfaces 20, 22, respectively. Panel 24 is preferably transparent glass which may be tempered, laminated, or otherwise strengthened using conventional techniques and principles. Panel 24 may be curved, bent or generally planar, having two substantially parallel sides, surfaces, or faces 20, 22 terminating in a peripheral edge 18 forming a panel having a predetermined geometric shape. Although transparent glass is preferred, other sheet-like panel materials may also be used, such as opaque or coated glass, transparent coated or opaque plastic materials, or multi-composite laminates, such as transparent glass and plastic.

Figure 2:
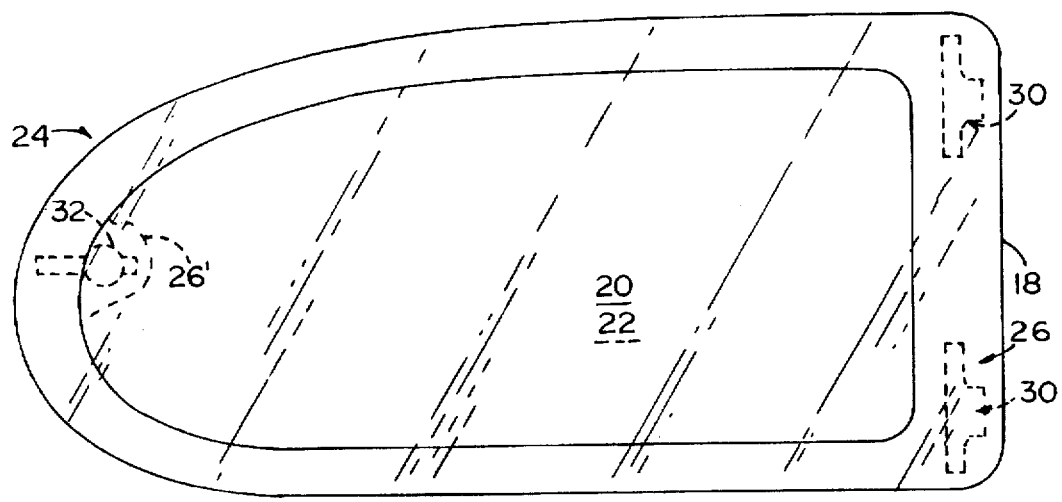
FIG. 2 is a side elevational view of an exterior surface of the articulated panel assembly of FIG. 1.
Figure 3:
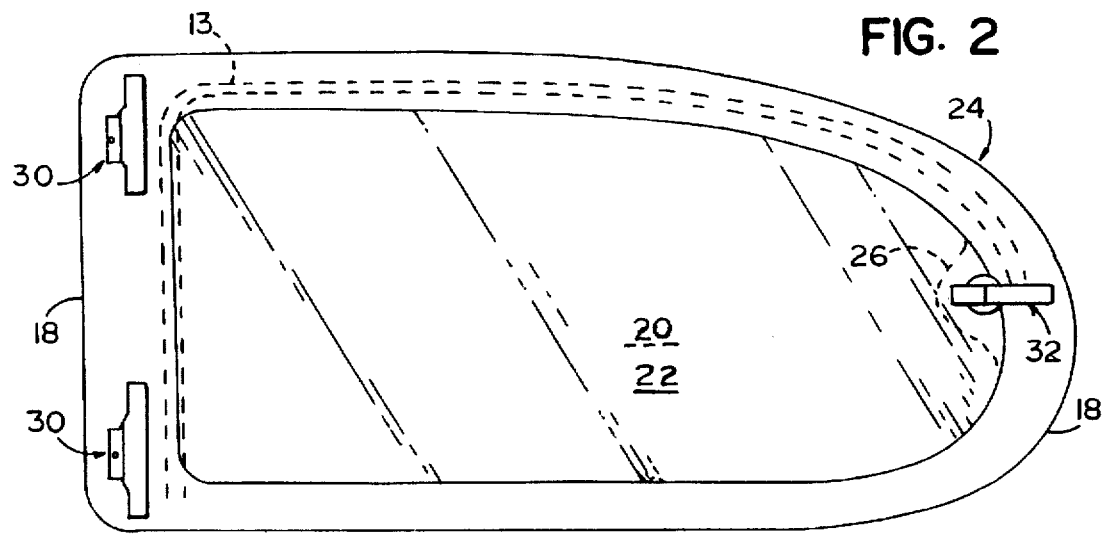
FIG. 3 is a side elevational view of the opposite, inner surface of the articulated panel assembly shown in FIG. 2.
Figure 4:
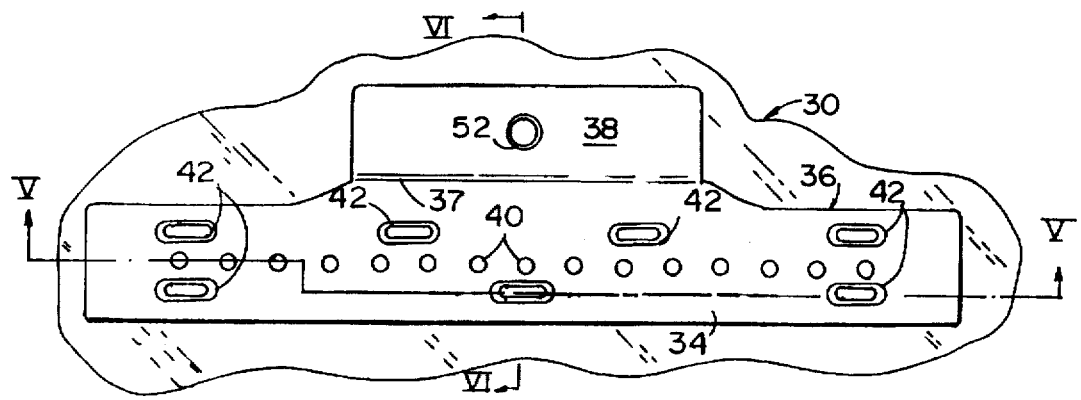
FIG. 4 is a plan view of one embodiment of a hinge mounted on the panel of FIGS. 1–3.

Optionally and preferably, deposited on and bonded to surface 22 of panel 24 is an opaque, and preferably black frit layer 26, and most preferably, a ceramic frit layer or coating covering and concealing a region of surface 22 from peripheral edge 18 inward. Alternatively, frit layer 26 may cover all or substantially all of surface 22. Usually, however, frit layer 26 conceals a continuous peripheral strip of surface 22 near edge 18, such as two inches in from edge 18, as shown in FIGS. 2 and 3.

Glass panel 24, which is initially in an untempered condition after cutting and sizing to its desired shape, can be painted by screen coating or other techniques, with a coating of dark ceramic paint on its inner surface 22. Thereafter, glass panel 24 is heated and bent to the desired contour with a bending furnace or other bending apparatus, followed by tempering to strengthen the glass. Such heating, bending and tempering operations cause the ceramic paint 26 to become fused to surface 22. Thus, although starting as a layer of paint containing ceramic particles and pigment, coating 26 ends up after bending and tempering, as a thin frit layer of ceramic material, which, in actuality, is fused to surface 22 of glass panel 24. Since ceramic frit coating 26 includes a pigment of a desired color, preferably a dark color such as black or the like, the layer results in a permanent, second or inside surface coloration of glass panel 24. When viewed from the opposite or outer side 20, the transparent thickness of panel 24, backed up by the colored ceramic frit layer 26, provides an appearance of depth and richness which blends well with the surrounding painted or glass areas on a vehicle.

One ceramic paint used to form the opaque black ceramic frit coating 26, described above, is manufactured by the Drakenfeld Pigments Division of Ciba-Geigy Corporation located in Washington, Pa. Such paint includes small ceramic particles and a suitable metal oxide pigment suspended in oil of a type conventionally known in the art. The resulting frit layer is opaque and normally black in color. This ceramic paint is preferably screen-coated on a predetermined portion of inner surface 20 of panel 24 using a 200-mesh screen. Ceramic particles in layer 26 are melted and fused to one another, are permanently bonded and fused to the inner glass surface 22, and form the equivalent of the glass itself in terms of strength and adherence.

Fixed to ceramic frit layer 26 and spaced inwardly from peripheral edge 18 toward the center of the panel are at least one, and preferably no more than two, mounting members 30, and at least one member 32 which cooperate to retain and articulate panel assembly 24 within window opening 14. Each mounting member 30, 32, is bonded at least 0.125 inch inboard of peripheral edge 18 to panel inner surface 22 to retain panel 24 within window opening 14 without the need to extend a fastener through the sheet-like panel 24 or encapsulate the peripheral edge 18 of panel 24 with a resinous gasket extending around the panel edge on both inner and outer surfaces or the like. Described in greater detail below, the bond between mounting members 30, 32 and glass panel 24 and/or frit layer 26 is sufficient to withstand loads greater than 150 pounds, preferably greater than 250 pounds, and most preferably about 300 pounds, even after environmental exposure. The resulting bond is such that if failure occurs under these loads, the failure mode is other than in the adhesive bond interface between mounting members 30, 32 and panel 24. That is to say, if a failure occurs in the bond between mounting members 30, 32 and panel 24 under a load, the failure mode will be a mechanical failure of the substrate (mounting member or panel) or in the cohesion of the adhesive itself. For the purposes of this description, the adhesive bond or adhesion of the adhesive with the mounting member or panel is the ability of the adhesive to adhere to the substrate. Cohesion is the ability of the adhesive to bond with itself.

In one embodiment (FIGS. 4–6), each mounting member 30 is a 0.1 to 10.0 millimeter (mm) thick, and preferably 0.5 to 1.0 mm thick, 1050 spring steel hinge having an elongate flange portion 34 with one edge 36 defining an adjoining tab 38. Tab 38 is offset from the plane of flange 34 by leg 37. Tab 38 is thus bent in an S-shaped form with respect to flange 34 although the free end portion tab 38 is generally parallel to flange 34. The bends between tab 38 and flange 34, and particularly leg 37, provide a spring-like hinge, the operation of which will become readily apparent below. Hinge flange 34 may also be prestressed or bent to conform to the surface of panel 24, especially if the panel is curved. In this regard, it is desirable to have a convex curvature to the surface of hinge flange 34 that is adhesively bonded to panel surface 24. This results in not only a more uniform adhesive bond, but also evenly distributes any load along the bonding surface and economizes the amount of adhesive used. Extending through tab 38 and away from panel 24 is a stud 52, having a head 53 bonded with or welded to tab 38. The opposite end of stud 52 is to be fastened to the vehicle as explained below.

Optionally, formed in flange portion 34, and extending therethrough, are a plurality of holes 40 generally aligned along the longitudinal axis of the flange. The size of each hole may range from 0.1 to 10 mm or more, but is preferably about 3.0 millimeters. In the preferred embodiment, holes 40 are spaced equidistantly from each other with the center points between the holes being approximately eight and one-half millimeters apart. The size and spacing of holes 40 are designed to provide optimum access of both air and moisture/humidity to permeate to an underlying adhesive described in greater detail below. The perforations also reduce the weight of each hinge, and provide a mechanical surface to bond with the adhesive and aid in bonding the hinge to the panel.

Flange portion 34 also contains embossments 42 adjacent aligned holes 40 which extend from a lower surface 44 of flange 34 and serve to space flange 34 from the inner surface 22 of panel 24. In a preferred embodiment, embossments 42 extend from flange 34 by a distance on the order of 0.1 to 3.0 mm, and preferably 1.0 mm. The actual distance may vary depending on the type of adhesive used. However, this offset distance has been found to be quite adequate for the variety of adhesives described below. Holes 40 and embossments 42 may be easily formed in flange portion 34 by stamping or punching during the formation of spring hinge 30.

For panel assemblies employing a single hinge 30, it is preferred that the surface area of flange 34 bonded to panel 24 be approximately between 4 square inches and 50 square inches, and most preferably approximately 15 square inches. On a two-hinge system, each hinge would preferably have a bonding area approximately between 2 and 50 inches square, and most preferably on the order of 4 square inches. A hinge bonding area of 4 square inches is about 1.6% of the surface area of a window panel having a surface area of 250 square inches. The aspect ratio (ratio of length to width) of each hinge, no matter whether a single hinge or dual hinge system, is preferably greater than 1 but less than 1,000, and most preferably approximately 8 to 10. Dimensions may vary depending upon the specific application. However, the hinge design is intended to provide the most bonding strength and structural stability economically and concealing the hinge in the frit area on the panel.

Although hinge 30 is described as being made from spring steel, other materials may also be used such as cold rolled steel, plastics, composite materials and other materials which are capable of withstanding flexural or bending moments. These materials will become apparent to one of ordinary skill in the art.

Figure 5:
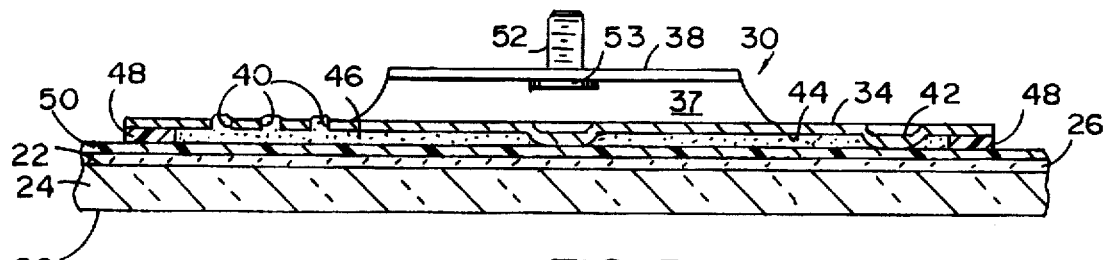
FIG. 5 is a fragmentary sectional view of the panel and hinge taken along line V—V in FIG. 4.
Figure 6:
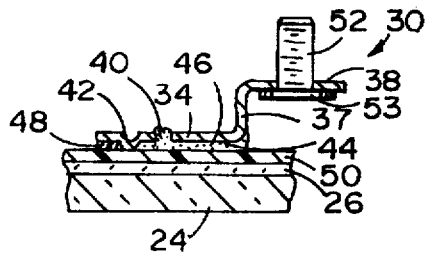
FIG. 6 is a fragmentary sectional view of the panel and hinge taken along line VI—VI in FIG. 4.

Referring to FIGS. 5 and 6, flange 34 of hinge 30 has its lower surface 44 bonded to frit layer 26 by a first and second adhesive 46 and 48, respectively. In a preferred embodiment, adhesive 48 is a temporary fixturing adhesive such as a hot-melt thermoplastic, which temporarily locates or fixtures hinge 30 against frit 26, while adhesive 46 cures and forms the permanent primary bond. Adhesive 46 may be selected from a number of adhesives classes including moisture-activated urethanes such as described in U.S. Pat. No. 3,707,521 incorporated herein by reference, moisture-activated silicones, moisture-curable activated urethanes, chemically-activated adhesives, and thermally-activated adhesives, such as shown in Table I below. Other adhesives, such as aerobically-cured, anaerobically-cured, and radiation-cured adhesives can also be used. When cured, the bond-line thickness is in the range of 1 micron to 10 mm, preferably 5 microns to 5 mm, and most preferably 25 microns to 1 mm. For large area vehicle windows where load integrity over a long surface life and through extreme climatic conditions is critical, thermosetting adhesives such as urethanes, silicones, acrylates, and epoxies are preferred over thermoplastic adhesives such as polyvinylbutyral. For moisture-activated adhesives, it is preferable that the assemblies be exposed to a high humidity atmosphere after initial bonding is achieved in order to promote rapid, complete cure of the adhesive. In this regard, it is preferable that the assemblies be exposed to a relative humidity in excess of 40 percent R.H. and preferably, in excess of 75 percent R.H. for a time period ranging from about 30 minutes to approximately 24 hours, or longer, and at a temperature range from about 60° F. to about 250° F., preferably about 75° F. to about 110° F. Chemically-activated adhesives can be activated by means such as catalysts, curing agents, and their equivalents as conventionally known in the adhesive arts. Activation can be promoted by heat and/or by radiation including ultraviolet radiation and microwave radiation. Thermally-activated adhesives may be activated by a variety of heating means including convective heating, infrared heating, focused infrared hearing, inductive or induction heating, conductive heating, microwave heating and their equivalents such as are described in co-pending U.S. patent application Ser. No. 897,764, now U.S. Pat. No. 5,331,784. Cure of the bond joint and the assemblies can be promoted and achieved by use of ovens, high humidity chambers, conveyors, heaters and by their combination.

TABLE I

| Manufacturer | Trade Name | Type |
|---|---|---|
| Essex Specialty Chemicals[1] | BetaSeal ™ 57302 | Moisture-activated urethane |
| Morton Yokohama[2] | WS70-FK | Moisture-activated urethane |
| Sika[3] | Sika-Flex ™ 255-FC | Moisture-activated urethane |
| Dow Corning[4] | 732 | Moisture-activated silicone |
| Dow Corning | Q3-6611 | Thermally-activated silicone |
| Dow Corning | X3-6265 | Thermally-activated silicone |
| 3M[5] | JetWeld ™ TS-230 | Moisture-curable hot melt urethane |
| 3M | Scotchweld AF-126-2 | Thermally-activated modified epoxy |
| 3M | Scotchweld AF-163-2U | Thermally-activated modified epoxy |
| Dymax[6] | 625-BT | Chemically-activated acrylate |
| Ciba Geigy[7] | R 382-3 | Thermally-activated modified epoxy |
| Ciba Geigy | R 609 | Thermally-activated modified epoxy |
| Dexter Adhesives[8] | EA 9628 | Thermally-activated modified epoxy |
| B. F. Goodrich[9] | PL-760 | Thermally-activated modified epoxy |
| B. F. Goodrich | PL-776 | Thermally-activated modified epoxy |
| B. F. Goodrich | PL-633 | Thermally-activated nitrile-phenolic |

[1]Essex Specialty Products, Sayreville, New Jersey
[2]Morton International, Ridgewood, Illinois
[3]Sika, Southfield, Michigan
[4]Dow Corning, Midland, Michigan
[5]3M Corporation, St. Paul, Minnesota
[6]Dymax, Engineering Adhesives, Torrington, Connecticut
[7]Ciba Geigy, Anaheim, California
[8]Dexter Adhesive & Structural Materials of Pittsburgh, California
[9]B. F. Goodrich, Adhesives Systems Division, Akron, Ohio It is further preferred that the selected adhesive come in a single package so that no mixing of reactants need occur prior to application. The one-package adhesives provide a much more efficient method than prior adhesives requiring mixing of reactants. It is further preferred that the adhesive have a jelly-like consistency, preferably having a viscosity at 25° C. greater than 5 Poise, and most preferably greater than 100 Poise, or can also be a hot-melted adhesive, or in film form for easy application. Adhesive 46 is preferably a urethane adhesive and most preferably a moisture-activated adhesive urethane such as Morton Yokohama WS70-FK, available from Morton International of Ridgewood, Ill., although epoxies and activated adhesives may also be used. Stand-offs or embossments 42 provide a space between hinge flange 34 and the surface of frit layer 26 for adhesive 46. In addition, holes 40 extending the length of hinge flange 34 allow adhesive 46 to be extruded therethrough to provide a mechanical coupling due to the extension of adhesive over the edges of the holes 40, as well as to provide an avenue for the permeation of moisture to complete the cure of the adhesive.

To improve and promote the bonding characteristics of adhesive 46 glass inner surface 22 or frit layer 26, and/or the lower surface 44 of hinge flange 34 may be coated with an adhesion-promoting compound or primer 50. These adhesion-promoting compounds generally include silanes such as available from Dow Corning, or titanium or zirconium coupling agents such as available from Kenrich Petrochemical, Inc., of Bayon, N.J., or equivalents, which greatly enhance the bonding ability of the adhesive to the substrate. If the primer 50 is applied to frit layer 26 or onto glass surface 22, a preferred primer is designated Morton Yokohama MS-90 available from Morton International in Ridgewood, Ill. If primer 50 is applied to a metallic surface such as hinge flange 34, a preferred primer is Morton Yokohama RC-50, also available from Morton International. Although these two primers are preferred, they are not the only primers available which may be equally if not more suitable for the application. Although the adhesion-promoting compound 50 may be applied to frit coating 26 and to lower surface 44 of flange 34, FIGS. 5 and 6 illustrate the primer compound only on frit coating 26. Adhesive 46, combined with adhesion-promoting compound or primer 50, provides a bond between frit coating 26 and hinge 30, which exceeds standards established by many U.S. automobile manufacturers for window panels. Bonding strengths will vary depending upon the bonding surface area and the types of base materials used. Based upon the materials described herein, the majority of bonds withstood straight pull tests of more than 150 pounds applied at a rate of 25 millimeters per minute without a failure of the cohesion or adhesion after environmental exposure.

In a first embodiment of window panel assembly 12, two hinges 30, such as described above, are bonded to frit coating 26 inwardly from peripheral edge 18 and spaced from each other so as to provide generally balanced support for panel assembly 12. To locate panel assembly 12 within window opening 14, a mounting stud 52 passing through hinge flange or tab 38 is received through an opening 54 formed in a pinch weld flange 56 which defines window opening 14 (see FIG. 10). Stud 52 is then retained within hole 54 by a suitable fastener. In the alternative, stud 52 may be replaced with a self-anchoring fastener such as a Christmas-tree post or other similar fastener.

Figure 7:
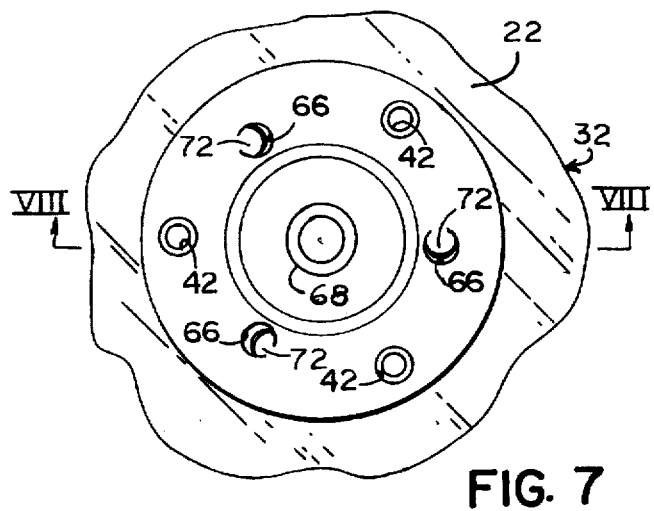
FIG. 7 is a fragmentary plan view of one embodiment of a mounting stud for use in association with a latching mechanism, the stud being mounted on the panel assembly of FIGS. 1–3.

Distant from hinges 30, and preferably at an opposite end of panel assembly 12, is at least one mounting member or latch mount 32. See FIGS. 1, 7 and 8. In a preferred embodiment, mounting member 32 is a mounting stud having a disk or circular-shaped flange 60 made from 1.0 millimeter thick, 1010 cold rolled steel. Disk 60 has a lower surface 62 which is concave, and an upper surface 64 which is convex, as a result of contours formed by several concentric rings or shoulders 78, 80, respectively, formed in disk 60.

Formed in disk 60 and spaced equidistantly from each other, are a plurality of embossments 42 which define stand-offs extending from lower surface 62 of disk 60 similar to those described above. Between embossments 42, and preferably spaced equidistantly from each other, are holes or rotated lances 66 piercing disk 60. Holes or rotated lances 66 are formed from lower surface 62 through to surface 64. Rotated lances are formed in such a manner so as to produce a tag or vane 72 inclined above each hole 66 (FIG. 8a).

Extending upwardly from surface 64 through a hole 70 located generally in the center of disk 60 is a stud 68. Stud 68 is permanently fixed to disk 60 by welding flange 74 to lower surface 62. Flange 74 of stud 68 lies substantially within the uppermost concave portion 76 of surface 62 to provide a maximum offset between stud flange 74 and panel 24.

Disk 60 is bonded to panel 24 in generally the same manner as hinge 30 described above. The inner surface 22 of panel 24 may be coated with opaque frit layer 26 either in an area restricted to that for button stud 60, i.e., slightly larger than the area of lower surface 62 of disk 60, or is generally coated with the frit layer 26 as indicated by dash line 26' shown in FIGS. 2 and 3. Lower surface 62 of disk 60 and frit layer coating 26 are preferably coated with the desired adhesion-promoting primer compound 50 as described above. The central portion of concave surface 62 of disk 60 is permanently bonded to frit layer 26 by adhesive 46 while the peripheral edge of surface 62 is temporarily fixtured to frit layer 26 by a thermoplastic hot-melt or other adhesive 48. Moreover, permanent adhesive 46 mechanically bonds disk 60 to frit layer 26 by a portion of adhesive 46 extruded through holes or rotated lances 66. In the case of rotated lances, extrusion of adhesive 46 is minimized by tab or vane 72 partially damming or restricting flow of adhesive 46 through each rotated lance 66. Embossments or stand-offs 42 extending from lower surface 62 provide a space between panel surface 22 or frit layer 26 and disk 60. Mounting stud or disk 60 is fitted with an appropriate latching or actuating mechanism (not shown) which is attached to the inside of window opening 14 and which is used to actuate window assembly 12 between the open and closed positions via hinges 30. Such actuators include over-center hinges, as well as pneumatic, electric or cable actuators.

In the alternative to centrally locating adhesive 46 between disk 60 and frit layer 26 as shown in FIG. 8, thermoplastic adhesive 48 may be located below stud flange 74 while a bead of adhesive 46 is placed thereabout. Fixturing of disk 60 is still obtained by the thermoplastic hot-melt or other adhesive 48 located in a central portion of disk 60, while the primary adhesive 46 is then forced outwardly toward the peripheral edges of disk 60 to provide the maximum bonding surface area. In yet another alternative, fixturing adhesive 48 may be omitted and both hinge 30 and mounting member 60 may be mechanically fixtured on panel 24 while the primary adhesive 46 cures. Examples of mechanical fixturing include gravity, mechanical locating, pressing or clamping including robotic, and manual locating, pressing or clamping.

Figure 13:
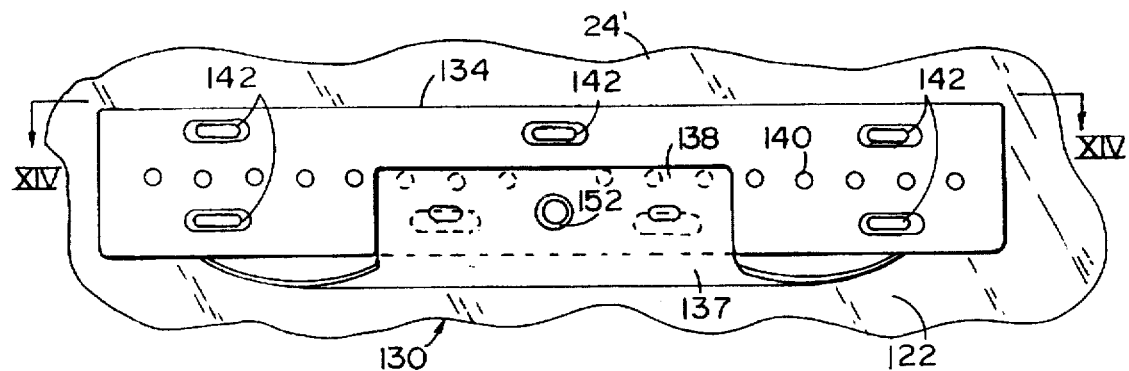
FIG. 13 is a fragmentary plan view of another embodiment of a hinge adapted for mounting on the panel of FIGS. 1–3.
Figure 14:
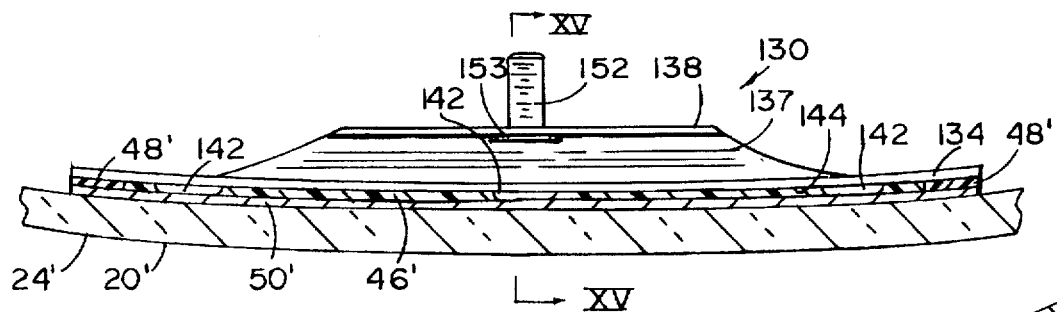
FIG. 14 is a fragmentary sectional view of the panel and hinge taken along line XIV—XIV in FIG. 13.
Figure 15:
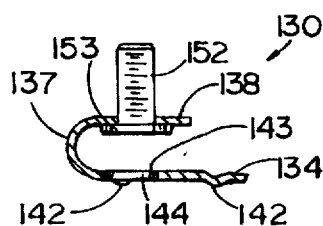
FIG. 15 is a fragmentary sectional view of the hinge of FIGS. 13 and 14 taken along line XV—XV in FIG. 14.
Figure 11:
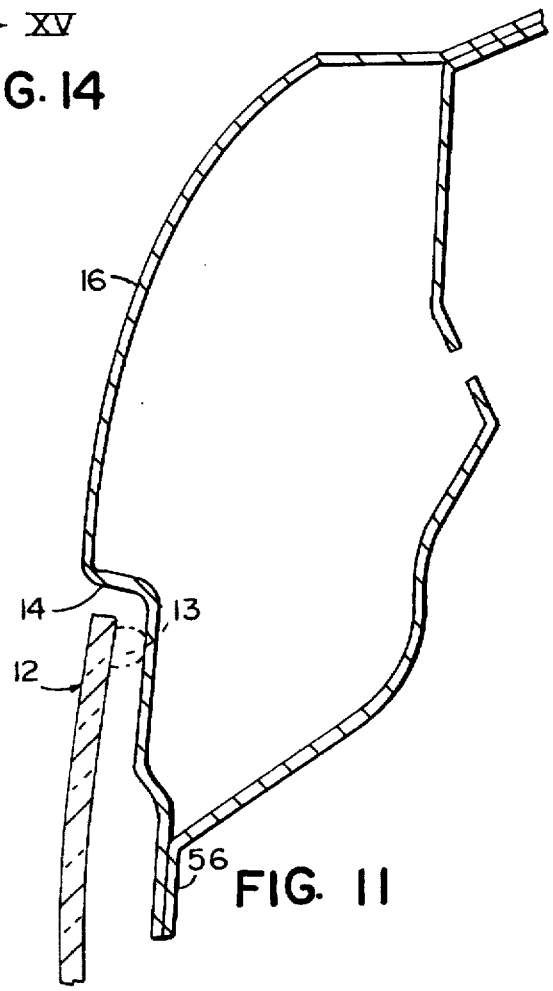
FIG. 11 is a fragmentary sectional view of the panel assembly on a vehicle and taken along line XI—XI in FIG. 1.

A preferred embodiment of the invention includes hinge 130, shown in FIGS. 13–15, made from 1.0 millimeter thick, 1010 cold-rolled, half-hardened, epoxy E-coated steel in a U-shape such that tab portion 138 overlies and is parallel to elongate flange portion 134. It is preferred that the grain of the steel be oriented generally perpendicular to the axis of the arcuate, U-shaped bend. Leg 137 interconnecting flange 134 and tab 138 is arcuate to provide the spring-like hinge action. Flange 134 contains a plurality of holes 140 which are generally aligned along the longitudinal axis of the flange at equidistantly spaced intervals, preferably approximately 8.5 millimeters. Moreover, the preferred diameter of each hole 140 is about 3.0 millimeters.

Flange 134 also contains embossments 142 which extend from lower surface 144 and serve to space flange 134 from panel inner surface 122. Preferably, embossments 142 extend approximately 1 millimeter from flange 134. As shown in FIG. 14, the outer ends of flange 134 may curve slightly upwardly before attachment to panel 24'. Such ends are pressed down against panel 24' when fixtured or secured to the panel. Flange 134 also includes a large hole 143 located directly opposite the portion of tab 138 which receives stud 152. Hole 143 is provided to allow stud 152 to be placed through tab 138 so that stud head 153 can be welded or bonded to tab 138. The opposite end of stud 152 extending from tab 138 is to be fastened to the vehicle as described below. As shown in FIG. 14, hinge 130 is curved and preferably applied to panel 24' in a manner similar to that described for hinge 30 on panel 24. Panel surface 22' preferably includes a primer 50' corresponding to primer 50 and adhesives 46', 48' may be used in the same manner as adhesives 46, 48 for hinge 30.

Window assembly 12 may also include a gasket 13 (FIGS. 3 and 9) mounted to inner surface 22 or to pinch weld flange 56 to seal window assembly 12 in the window opening 14 when panel 24 is in the closed position. A variety of seals may be used including a bubble seal such as described in copending, commonly-assigned U.S. patent application Ser. No. 957,417, filed Oct. 5, 1992 now issued as U.S. Pat. No. 5,261,721, the disclosure of which is incorporated herein by reference. Other gaskets are described in copending, commonly-assigned U.S. patent application Ser. No. 898,094 filed Jun. 12, 1992, now issued as U.S. Pat. No. 5,443,673, and U.S. patent application Ser. No. 897,764 filed Jun. 12, 1992, now issued as U.S. Pat. No. 5,331,784, both of which are also incorporated herein by reference. These later two disclosures are more pertinent to fixed window assemblies than articulated window assemblies. Yet another sealing arrangement is disclosed in copending, commonly-assigned U.S. patent application Ser. No. 027,078 filed Mar. 5, 1993, now issued as U.S. Pat. No. 5,544,458, also incorporated herein by reference.

In manufacturing window assembly 12, hinges 30, 130 and disk 60 are preferably cleaned with isopropyl alcohol to remove any dirt and debris. The isopropyl alcohol is also used to clean the glass surface and/or frit coating 26 which will receive hinges 30, 130 and disk 60. After cleaning of the surfaces, panel surface 22 and/or frit coating 26 receive adhesion-promoting primer compound 50 which is then allowed to dry. Optionally, while adhesion-promoting primer compound 50 on panel 24 is drying, the appropriate primer 50 may also be applied to bottom surface 44 of hinges 30, 130 and to lower surface 62 of disk 60 and allowed to dry.

Primer 50 may be applied to hinges 30, 130 and disk 60 in a variety of ways, including using a dauber, a wipe, spray or other applicator. In a preferred embodiment, primer 50 is applied to hinges 30, 130 and disk 60 in one direction with a dauber wipe to obtain as uniform a coat as possible. If any bare spots appear after the initial cure time, another coat of primer 50 may be applied in the same direction. Automated systems such as robotic or conveyor systems may be used to carry out the application.

Once primer 50 has dried, the preferred urethane adhesive 46 is applied in a bead to hinges 30, 130 and disk 60. For single-piece application, adhesive 46 may be applied using a glue gun, caulking gun or similar applicator. For multi-piece applications, robotic or conveyor applicators would be more appropriate. Sufficient room is provided on hinges 30, 130 and disk 60 to receive the hot melt or thermoplastic fixturing adhesive 48 which may be applied using any of the above techniques.

Soon after thermoplastic adhesive 48 is applied to mounting members 30, 32, 130, they are located on and engaged with the surface 22 of panel 24 overlying the frit coating 26. It is preferred that each mounting member 30, 32, 130 be temporarily held in place at least until thermoplastic fixturing adhesive 48 has set. If fixturing adhesive 48 is not used, mounting member 30, 32, 130 most likely will need to remain still relative to panel 24 for a longer period until bonding adhesive 46 cures. As mentioned above; this may be achieved by gravity, manual, or mechanical means. Each panel assembly 12 is then placed in a chamber where the assemblies are preferably cured at a temperature of approximately 90° F. and a relative humidity greater than 85 percent. The holes extending through flange 34 of hinge 30, and through disk 60 allow the moisture in the curing chamber to permeate adhesive 46 which results in a net decrease in curing time. It has been found that a cure time of about six hours for flanges without holes can be decreased to about four hours for flanges with holes. Following the cure time in the chamber, the finished panel assemblies 12 are then ready for shipment to the vehicle manufacturer.

It is preferred that a moisture-activated urethane adhesive be used. Window panel assemblies manufactured using the moisture-activated Morton Yokohama WS70-FK urethane adhesive, and the Morton Yokohama MS-90 and RC-50 primers, resulted in bonds between the mounting members and panels which withstood straight pull test tensional load greater than 250 pounds, and a vast majority withstood loads greater than 300 pounds. In at least two instances, the bonds withstood tensional loads on the order of 400 pounds.

Other tests were conducted on the window assemblies which included thermal cycle tests, water immersion (80° C.) for 100 and 240 hours, vibration tests, CASS, and impact tests. In general, the bonds between the mounting members and panel withstood loads, on average, greater than 225 pounds while loads greater than 50 pounds were achieved on average for panels subjected to immersion in 80° C. water for 100 and 240 hours. Similar or better results were achieved on samples subjected to vibration, CASS and impact tests. Similar results can be achieved using the family or classes of adhesives described above.

The above description is considered that of the preferred embodiments only. Modification of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating.

2. The hinged window assembly of claim 1 wherein said glass sheet is transparent; said first opaque coating being a frit layer bonded to portions of said inner glass sheet surface adjacent to said peripheral edge of said sheet such that a central viewing area is defined by said peripheral frit layer, and wherein at least a portion of said second opaque coating is located within said central viewing area.

3. The hinged window assembly of claim 1 wherein said adhesive is selected from the group consisting essentially of: moisture-activated adhesives, thermally-activated adhesives, chemically-activated adhesives, aerobically-cured adhesives, anaerobically-cured adhesives, and radiation-cured adhesives.

4. The hinged window assembly of claim 1 wherein said second opaque coating is a frit layer bonded to said inner glass sheet surface at a location spaced from said hinge mounting area.

5. The hinged window assembly of claim 4 further including an adhesion-promoting compound between said second opaque coating and said adhesive bonding said latch mount to said sheet.

6. The hinged window assembly of claim 5 wherein said adhesive is a moisture activated adhesive.

7. The hinged window assembly of claim 5 wherein said adhesive is a thermally activated adhesive.

8. The hinged window assembly of claim 5 wherein said adhesive is a chemically activated adhesive.

9. The hinged window assembly of claim 4 wherein said bonding of said latch mount to said inner surface of said sheet is sufficiently strong to withstand a straight pull test of about 150 pounds at a rate of about 25 millimeters per minute.

10. The hinged window assembly of claim 9 wherein said pull test is performed after soaking the panel assembly in 80° C. water for at least 100 hours.

11. The hinged window assembly of claim 1 including an adhesion promoting compound between said second opaque coating and said adhesive; said adhesive comprising an activated adhesive.

12. The hinged window assembly of claim 1 wherein said latch mount has at least one projection for spacing said latch mount from said second opaque coating, said adhesive between said second opaque coating and said latch mount having a thickness defined by said projection.

13. The hinged window assembly of claim 12 wherein said bonding of said latch mount to said sheet forms a joint, said joint being sufficiently strong to withstand a straight pull test of about 150 pounds at a rate of about 25 millimeters per minute.

14. The hinged window assembly of claim 13 wherein said joint withstands said pull test after soaking said panel assembly in 80° C. water for at least 100 hours.

15. The hinged window assembly of claim 14 including an adhesion-promoting compound between said second opaque coating and said adhesive bonding said latch mount to said sheet.

16. The hinged window assembly of claim 14 wherein said adhesive is a moisture activated adhesive.

17. The hinged window assembly of claim 14 wherein said adhesive is a thermally activated adhesive.

18. The hinged window assembly of claim 14 wherein said adhesive is a chemically activated adhesive.

19. The hinged window assembly of claim 14 wherein said latch mount is formed from one of a metal, plastic and composite material.

20. The hinged window assembly of claim 1 wherein said latch mount includes at least one perforation therethrough for access to said adhesive and a mechanical bonding surface for said adhesive.

21. The hinged window assembly of claim 1 wherein said glass sheet outer surface has a surface area of at least 250 square inches; said hinge mounting area having at least one hinge member mounted on said first opaque coating; said hinge member having a surface area contacting said first opaque coating on said inner surface of said glass sheet no greater than about 1.6% of said outer surface area of said sheet.

22. The hinged window assembly of claim 21 wherein said hinge member is formed from one of metal, plastic and composite material.

23. The hinged window assembly of claim 1 wherein said glass sheet outer surface has a surface area of at least 250 square inches.

24. The hinged window assembly of claim 23 wherein said latch mount is formed from at least one of a metal, plastic and composite material.

25. The hinged window assembly of claim 24 wherein said vehicle is one of a van, a station wagon, a utility vehicle and a truck.

* * * * *

UNITED STATES PATENT AND TRADEMARK OFFICE
CERTIFICATE OF CORRECTION

PATENT NO. : 5,704,173 C1
APPLICATION NO. : 90/008441
DATED : August 26, 2008
INVENTOR(S) : Repp et al.

It is certified that error appears in the above-identified patent and that said Letters Patent is hereby corrected as shown below:

Column 2
Claim 12, Line 14, "mounted" should be --mounting--

Column 7
Claim 29, Line 40, "metalllic" should be --metallic--

Column 8
Claim 29, Line 9, "degress" should be --degrees--

Column 9
Claim 30, Line 60, "degress" should be --degrees--

Column 13
Claim 34, Line 3, "included" should be --including--

Column 15
Claim 37, Line 60, "edges" should be --edge--

Column 20
Claim 41, Line 30, insert --embossed-- after "embossments"

Column 21
Claim 42, Line 12, "from movement" should be --for movement--

Column 22
Claim 43, Line 23, insert --said-- before --first--

Column 23
Claim 43, Line 28, "adjesive" should be --adhesive--

Signed and Sealed this
Twenty-eighth Day of August, 2012

David J. Kappos
*Director of the United States Patent and Trademark Office*

CERTIFICATE OF CORRECTION (continued)
U.S. Pat. No. 5,704,173 C1

Column 25
Claim 45, Line 56, "adesive" should be --adhesive--

Column 26
Claim 45, Line 33, insert --joint-- after "bonding"

Column 33
Claim 49, Line 29, "including" should be --included--

(12) EX PARTE REEXAMINATION CERTIFICATE (6395th)
United States Patent
Repp et al.

(10) Number: US 5,704,173 C1
(45) Certificate Issued: *Aug. 26, 2008

(54) HINGED WINDOW ASSEMBLY

(75) Inventors: R. Scott Repp, Holland, MI (US); Pamela M. Stallman, Lawton, MI (US)

(73) Assignee: Magna Donnelly Corporation, Holland, MI (US)

Reexamination Request:
No. 90/008,441, Jan. 26, 2007

Reexamination Certificate for:
Patent No.: 5,704,173
Issued: Jan. 6, 1998
Appl. No.: 08/659,269
Filed: Jun. 6, 1996

( * ) Notice: This patent is subject to a terminal disclaimer.

Related U.S. Application Data

(63) Continuation of application No. 08/129,671, filed on Sep. 30, 1993, now Pat. No. 5,551,197.

(51) Int. Cl.
*B60J 1/12* (2006.01)
*B60J 1/14* (2006.01)
*B60J 1/00* (2006.01)
*E05D 7/00* (2006.01)

(52) U.S. Cl. .............. 52/204.62; 156/108; 296/201; 52/204.69; 52/208

(58) Field of Classification Search ............... None
See application file for complete search history.

(56) References Cited

U.S. PATENT DOCUMENTS

| | | |
|---|---|---|
| 2,390,260 A | 12/1945 | King |
| 2,996,221 A | 8/1961 | Grise |
| 3,282,014 A | 11/1966 | Hamford et al. ............ 52/627 |
| 3,707,521 A | 12/1972 | De Santis |
| 3,714,127 A | 1/1973 | Fabris et al. |
| 3,737,355 A | 6/1973 | Epstein et al. |
| 3,779,794 A | 12/1973 | De Santis |
| 3,791,074 A | 2/1974 | Waffenschmidt |
| 3,819,560 A | 6/1974 | Kehr |
| 3,974,753 A | 8/1976 | Blomgren et al. |
| 4,004,050 A | 1/1977 | Rabito et al. |
| 4,047,467 A | 9/1977 | Lundin |
| 4,097,442 A | 6/1978 | Kieft et al. |

(Continued)

FOREIGN PATENT DOCUMENTS

| | | |
|---|---|---|
| DE | 1902498 | 8/1970 |
| DE | 7520034 U | 11/1975 |
| DE | 2840811 | 4/1980 |

(Continued)

OTHER PUBLICATIONS

ADCO Products, Inc. "ADCO FC–1000 Fast Curing Urethane Auto Glass Adhesive", 4 pages.
ADCO Products, Inc., Material Safety Data Sheet, "AD–380 Urethane Auto Glass Sealant", 6 pages.
ADCO Products, Inc., Material Safety Data Sheet, "FC–1000 Urethane Sealant", 5 pages.

(Continued)

*Primary Examiner*—Peter C. English

(57) ABSTRACT

A flush-mounted articulated window assembly for use in a vehicle, the window assembly adapted to be mounted in a window opening such that, when closed, it is generally flush with the exterior surface of the vehicle. The window assembly includes a transparent sheet with at least one window-mounting member bonded by two separate adhesives to an inner surface of the sheet. The mounting member includes projections which space the mounting member from the inner sheet surface, and/or perforations which allow air and moisture to reach the space provided between the mounting member and the inner sheet surface. A first adhesive temporarily fixtures the mounting member to the sheet. A second adhesive permanently bonds the mounting member to the inner sheet surface. The bond created is sufficiently strong such that application of a load sufficient to cause a failure results in a failure other than in the adhesion of the adhesive to the mounting member and the panel.

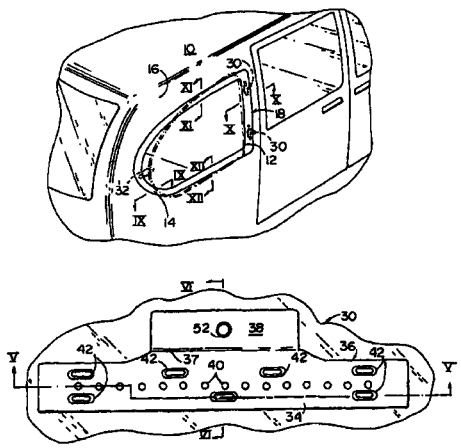

U.S. PATENT DOCUMENTS

| | | |
|---|---|---|
| 4,115,955 A | 9/1978 | Aldrich |
| 4,169,731 A | 10/1979 | Noshiro et al. |
| 4,216,051 A | 8/1980 | Brown et al. |
| 4,219,230 A | 8/1980 | Lapine |
| 4,226,052 A | 10/1980 | DeStepheno |
| 4,272,934 A | 6/1981 | Cowden et al. |
| 4,284,751 A | 8/1981 | Hutt et al. |
| 4,314,721 A | 2/1982 | Clark |
| 4,320,221 A | 3/1982 | Hoffman |
| 4,350,803 A | 9/1982 | Penn |
| 4,371,204 A | 2/1983 | George et al. |
| 4,414,052 A | 11/1983 | Habata et al. |
| 4,433,866 A | 2/1984 | Hagiwara |
| 4,438,609 A | 3/1984 | Nielson et al. |
| 4,444,976 A | 4/1984 | Rabito |
| 4,457,111 A | 7/1984 | Koike |
| 4,469,370 A | 9/1984 | Petersen |
| 4,489,127 A | 12/1984 | Gutek et al. |
| 4,500,606 A | 2/1985 | Rabito et al. |
| 4,511,626 A | 4/1985 | Schumacher |
| 4,539,345 A | 9/1985 | Hansen |
| 4,561,223 A | 12/1985 | Gold et al. |
| 4,572,872 A | 2/1986 | Yamazaki et al. |
| 4,576,670 A | 3/1986 | Schade |
| 4,582,738 A | 4/1986 | Kunert |
| 4,618,176 A | 10/1986 | Farmont |
| 4,621,469 A | 11/1986 | Kruschwitz |
| 4,626,475 A | 12/1986 | Goel et al. |
| 4,635,415 A | 1/1987 | Schumacher et al. |
| 4,643,794 A | 2/1987 | Saracsan et al. |
| 4,697,841 A | 10/1987 | Klein et al. |
| 4,743,672 A | 5/1988 | Goel ............................ 528/44 |
| 4,749,120 A | 6/1988 | Hatada |
| 4,755,251 A | 7/1988 | Cline et al. |
| 4,762,904 A | 8/1988 | Nakama |
| 4,775,570 A | 10/1988 | Ohlenforst et al. |
| 4,776,132 A | 10/1988 | Gold |
| 4,778,845 A | 10/1988 | Tschan et al. |
| 4,793,099 A | 12/1988 | Friese et al. ................... 49/380 |
| 4,799,730 A | 1/1989 | Harasaki |
| 4,826,239 A | 5/1989 | Nishikawa et al. |
| 4,839,122 A | 6/1989 | Weaver |
| 4,876,132 A | 10/1989 | Kunert |
| 4,879,853 A | 11/1989 | Braendle et al. |
| 4,881,773 A | 11/1989 | Ichinose |
| 4,894,972 A | 1/1990 | Endoh et al. |
| 4,903,455 A | 2/1990 | Veazey |
| 4,910,071 A | 3/1990 | Kunert |
| 4,923,756 A | 5/1990 | Chung et al. |
| 4,933,032 A | 6/1990 | Kunert |
| 4,950,715 A | 8/1990 | Duck et al. |
| 4,954,199 A | 9/1990 | Rains et al. |
| 4,963,220 A | 10/1990 | Bachmann et al. |
| 4,963,636 A | 10/1990 | Mulhaupt et al. |
| 4,985,535 A | 1/1991 | Takada et al. |
| 4,987,699 A | 1/1991 | Gold |
| 4,994,315 A | 2/1991 | Schreiber et al. |
| 4,994,540 A | 2/1991 | Boerner et al. |
| 4,995,666 A | 2/1991 | Schurmann ................. 296/216 |
| 5,002,806 A | 3/1991 | Chung |
| 5,008,311 A | 4/1991 | Janoski |
| 5,023,668 A | 6/1991 | Kluy et al. |
| 5,028,082 A | 7/1991 | Kronbetter |
| 5,042,871 A | 8/1991 | Gotanda et al. |
| 5,069,512 A | 12/1991 | Sykes |
| 5,072,984 A | 12/1991 | Jackson ...................... 296/56 |
| 5,082,736 A | 1/1992 | Bravet et al. |
| 5,085,021 A | 2/1992 | Kunert |
| 5,092,492 A | 3/1992 | Centea |
| 5,112,877 A | 5/1992 | Barker et al. |
| 5,125,716 A | 6/1992 | Smith et al. |
| 5,131,349 A | 7/1992 | Keller et al. |
| 5,137,770 A | 8/1992 | Rothe et al. |
| 5,143,996 A | 9/1992 | Chung et al. |
| 5,147,927 A | 9/1992 | Baghdachi et al. |
| 5,150,943 A | 9/1992 | Gold |
| 5,154,028 A | 10/1992 | Hill et al. |
| 5,185,402 A | 2/1993 | Fleming et al. |
| 5,206,331 A | 4/1993 | Tsuno et al. |
| 5,232,532 A | 8/1993 | Hori |
| 5,239,406 A | 8/1993 | Lynam |
| 5,279,882 A | 1/1994 | Daude et al. |
| 5,294,168 A | 3/1994 | Kronbetter |
| 5,302,333 A | 4/1994 | Capriotti et al. |
| 5,304,623 A | 4/1994 | Ito et al. |
| 5,310,796 A | 5/1994 | Warren et al. |
| 5,338,767 A | 8/1994 | Sartelet et al. |
| 5,342,867 A | 8/1994 | Ryan et al. |
| 5,342,873 A | 8/1994 | Merz et al. |
| 5,349,040 A | 9/1994 | Trinks et al. |
| 5,367,036 A | 11/1994 | Saito et al. |
| 5,401,453 A | 3/1995 | Moretz et al. |
| 5,459,185 A | 10/1995 | Nakata et al. |
| 5,475,956 A | 12/1995 | Agrawal et al. |
| 5,476,626 A | 12/1995 | Miyama et al. |
| 5,492,951 A | 2/1996 | Beyrle et al. |
| 5,508,111 A | 4/1996 | Schmucker |
| 5,523,877 A | 6/1996 | Lynam |
| 5,529,655 A | 6/1996 | Bravet et al. ............ 156/244.17 |
| 5,548,056 A | 8/1996 | Chung |
| 5,551,197 A * | 9/1996 | Repp et al. ................ 52/204.62 |
| 5,567,530 A | 10/1996 | Drujon et al. |
| 5,631,318 A | 5/1997 | Ito et al. |
| 5,680,245 A | 10/1997 | Lynam |
| 5,707,473 A | 1/1998 | Agrawal et al. |
| 5,723,205 A | 3/1998 | Millette et al. |
| 5,744,557 A | 4/1998 | McCormick et al. |
| 5,747,581 A | 5/1998 | Proebester et al. |
| 5,763,011 A | 6/1998 | Miyama et al. |
| 5,853,895 A | 12/1998 | Lewno |
| 5,864,419 A | 1/1999 | Lynam |
| 5,966,874 A | 10/1999 | Repp et al. |
| 5,986,797 A | 11/1999 | Lynam |
| 6,054,001 A | 4/2000 | Swanson et al. |
| 6,068,719 A | 5/2000 | Lewno |
| 6,122,093 A | 9/2000 | Lynam |
| 6,128,860 A | 10/2000 | Repp et al. |
| 6,203,639 B1 | 3/2001 | Swanson et al. |
| 6,298,606 B1 | 10/2001 | Repp et al. |
| 6,319,344 B1 | 11/2001 | Lewno |
| 6,521,083 B1 | 2/2003 | Swanson et al. |
| 6,599,386 B2 | 7/2003 | Swanson et al. |
| 6,819,467 B2 | 11/2004 | Lynam |
| 6,846,039 B2 | 1/2005 | Lewno |
| 6,871,450 B2 | 3/2005 | Repp et al. |
| 6,926,949 B1 | 8/2005 | Halg et al. |

FOREIGN PATENT DOCUMENTS

| | | |
|---|---|---|
| DE | 3044614 | 7/1982 |
| DE | 32 46 396 A1 | 2/1984 |
| DE | 3409903 A1 | 10/1984 |
| DE | 3404693 | 9/1985 |
| DE | 3419893 A1 | 11/1985 |
| DE | 3501490 A1 | 7/1986 |
| DE | 3509531 | 12/1986 |
| DE | 36 24 621 A1 | 4/1987 |
| DE | 3643472 A1 | 12/1987 |
| DE | 3727413 | 2/1988 |
| DE | 3641363 | 6/1988 |
| DE | 3832178 A1 | 4/1990 |
| DE | 3925804 | 8/1990 |

| | | |
|---|---|---|
| DE | 4002514 A1 | 8/1990 |
| DE | 4113816 | 11/1991 |
| DE | 4129492 | 1/1993 |
| EP | 0096128 A1 | 12/1983 |
| EP | 0096129 A1 | 12/1983 |
| EP | 0109659 A2 | 5/1984 |
| EP | 0128086 A2 | 12/1984 |
| EP | 0219903 A1 | 4/1987 |
| EP | 289156 A1 | 11/1988 |
| EP | 0298788 | 1/1989 |
| EP | 0307316 A2 | 3/1989 |
| EP | 0345134 A2 | 12/1989 |
| EP | 0352151 | 1/1990 |
| EP | 0368728 A2 | 5/1990 |
| EP | 0385924 | 9/1990 |
| EP | 0400291 A1 | 12/1990 |
| EP | 0418123 | 3/1991 |
| EP | 0494824 | 7/1992 |
| EP | 526327 A1 | 2/1993 |
| EP | 0542673 A1 | 5/1993 |
| EP | 0576179 | 12/1993 |
| EP | 0576180 A1 | 12/1993 |
| EP | 650768 | 5/1995 |
| GB | 1215267 | 12/1970 |
| GB | 1235056 | 6/1971 |
| GB | 1452812 | 10/1976 |
| GB | 2001700 A | 2/1979 |
| GB | 1573354 | 8/1980 |
| GB | 2048356 A | 12/1980 |
| GB | 2174746 A | 11/1986 |
| GB | 2215717 A | 9/1989 |
| JP | 47-11057 | 4/1972 |
| JP | 46-95369 | 6/1972 |
| JP | 47-36332 | 11/1972 |
| JP | 49-47624 | 5/1974 |
| JP | 58-47533 | 3/1983 |
| JP | 61-266337 | 11/1986 |
| JP | 62-278035 | 2/1987 |
| JP | 63060131 | 3/1988 |
| JP | 64-45520 U | 3/1989 |
| JP | 1122722 | 5/1989 |
| JP | H2258844 | 10/1990 |
| JP | H370626 | 3/1991 |
| JP | 3070626 | 3/1991 |
| JP | 3236922 | 10/1991 |
| WO | WO 95/02621 | 1/1995 |

OTHER PUBLICATIONS

Essex Specialty Products, Inc., "Betamate® Structural Adhesives Testing Procedures For Prepainted Metal", 22 pages.
CSR #87–318, Project #IC 501, Book #1206, "Betamate Structural Adhesive Testing", 10 pages.
Betamate Structural Adhesives, "Two Component Urethanes", 1 page.
Essex Specialty Products, Inc., Technical Bulletin "Betamate® 73100/73003 Structural Adhesive", 8 pages.
1996 Dodge Caravan brochure.
1994 Mercury Villager brochure.
Photographs of side vent window allegedly from 1987 or 88 General Motors "CK" truck on sale or used by others more than one (1) year prior to Sep. 30, 1993.
Photographs of side vent window, origin unknown, allegedly on sale or used by others more than one (1) year prior to Sep. 30, 1993.
SAE Technical Paper 900519, Feb. 26, 1990.
SAE Technical Paper 910758, Feb. 25, 1991.
Photographs A–G of General Motors G300 Station wagon quarter window with hinged vent on sale or used by others more than one (1) year prior to Sep. 30, 1993.
European Search Report of corresponding European patent application No. 94307205.8.
Bonding with Epoxy Elastomeric Adhesives System, Glass to Metal Military Specification B–48612, Sep. 1, 1997.
Capri 2000 and Capri V–6, Sexy Europeans Imported for Lincoln–Mercury, Advertising Brochure, allegedly made public more than one year prior to the present application.
Capri One Success Story After Another, Advertising Brochure, allegedly made public more than one year prior to the present application.
Capri The Sexy European Imported by Lincoln–Mercury, LMC 70–111, Advertising Brochure, allegedly made public more than one year prior to the present application.
1970 to 1978 Capri Parts, Team Blitz Parts Source, Advertising Literature, allegedly made public more than one year prior to the present application.
Capri Sport Coupe, Excerpt from Advertising Brochure, allegedly made public more than one year prior to the present application.
Photographs of Chrysler AS minivan side window hinge on sale or used by others more than one (1) year prior to Sep. 30, 1993.
L. Kertesz, Hopeful: GM Tarrytown Workers Approve Part in Bid To Win Production of Minivan, Automotive News, Crain Communications, Inc. Jan. 19, 1987.
J. Dunne, Inside Detriot—GM's 1990 FWD Minivan, Popular Mechanics, May 1987.
Trans Sport Pontiac's Space Vehicle for the 90's, Advertising Brochure allegedly made public more than one year prior to the present application.
Valox Resin, Engineering Thermoplastic Properties Guide Product Information, GE Plastics Group allegedly made public more than one year prior to the present application.
Ashland Chemical's Pliogrip 6600 Urethane Adhesive, Technical Data, Jul. 1986.
Chrysler Corporation Material Standard, Structural Adhesive—Steel to Tempered Glass, MSCD618<S> Change: D, May 8, 1997.
Chrysler Corporation Process Standard, Bonding of Steel Channel to Tempered Glass With a Structural Adhesive, No. PS–6764<S> Change: C, Jun. 3, 1997.
Betaseal 43518 Clear Glass Primer Process Standard, Dow Automotive, Oct. 15, 1999.
Ashland Chemicals Pliogrip 6620, Technical Data, Oct. 1986.
Ashland Chemicals Pliogrip 6036 Wash Primer, Technical Data, Nov. 1986.
Ashland Pliogrip Adhesive Systems, 8200 Primer, Infotech Product Literature, 2000.
BetaSeal 43520A Blackout Glass Primer Process Standard, Dow Automotive, Oct. 17, 2001.
Dupont Rynite Thermoplastic Polyester Resin Product Information, Apr. 1, 1989.
Tyrite 7500 Urethane Adhesive System, DS10–3603B, Lord Industrial Adhesives Product Information, 1984.
Double Coated Industrial Tapes Reference Guide, 3M Industrial Tape and Specialties Division, 70–0702–0266–1(104.5)R1, 1994.
Material Safety Data Sheet etamate (R) 43518 Glass Primer, Essex Speciality Products, Inc., Aug. 2, 1993.

Scotch–Weld Adhesive 642/6 mil, Automotive Technical Data Sheet, 3M Automotive Systems Division, Jun. 20, 1987.

I. Houston, K. Dowing and K. Mack, General Motors—The Glue Line—Why How and When, SAE, Mar. 13, 1961.

R. Murray and L. Marlin, The Present and Future Status of Hot Melt Adhesives in the Automotive Industry, 700070, SAE, Jan. 12, 1970.

K. Habeeb, The Present and Future Uses of Reactive Type Adhesive, 700071, SAE, Jan. 12, 1970.

D. Weyher, Adhesives Used in Automotive Production, 710106, SAE, Jan. 11, 1971.

R. H. Beck and D.A. Yurek, Automotive Structural Bonding, 750077, SAE, Feb. 24, 1975.

G. Schneberger, Automotive Adhesives—Why, How, What, Where, 780191, SAE, Feb. 27, 1978.

G. Schneberger, Automotive Adhesives—Past,Present and Future, 800210,SAE, Feb. 25, 1980.

W.A. Pletcher, Bonding of Automotive Plastics—Technology and Applications, 810767, SAE, Jun. 8, 1981.

E. Plueddemann, Bonding to Metals, AD90–125, SAE, Nov. 1989.

M. Kimball, Reactive Hot Melt Adhesives for Automotive Bonding, AD90–126, SAE, Nov. 1989.

K. Schroeder and K. Drain, New Developments in Structural Adhesives, AD90–127, SAE, Nov. 1989.

Bonding and Coating Plastics in the Automotive Industry, EuroTrends, Nov. 1990.

G. MacIver, The State of Polyurethane Structural Adhesive Technology in the Transporation Industry, 910386, SAE, Feb. 25, 1991.

J. Cocoo, L. Moffa, D. Callanan, The Role of Design for Manufacturing and Adhesives in Solving Design Challenges, 910504, SAE. Feb. 25, 1991.

R. Agrawal, A. Agrawal and J. Thomas, Developments in Modular Windows For Automotive Applications, 910759, SAE, Feb. 25, 1991.

H. Kunert and G. Cornils, Advanced Concepts for Modular Glazings, 920201, SAE, Feb. 24, 1992.

I. Skeist and J. Miron, Introduction to Adhesives, Skeist Incorporated, allegedly made public more than one year prior to the present application.

J. Shields, Adhesives Handbook, Third Edition, Butterworth & Co., 1985.

A. Pocius, Third Generation Two–Part Epoxy Adhesives, 19th Int'l Sample Technical Conference, Oct. 1987.

E. Sydor, Bonding of Structural Adhesives, National Automotive Week Paper, SAE, Mar. 1961.

A. Pizzi and K. L. Mittal, Handbook of Adhesive Technology, Marcel Dekker Inc., 1994.

A. J. Kinloch, Adhesion and Adhesives, Science and Technology, Chapman and Hall,1987.

I. Johns, Adhesion Fundamentals, Industrial Adhesives and Sealants Seminar, Australasia Technical Papers, Lecture No. 1, SAE, Dec. 1979.

Kurt Devries, Analysis of Adhesive Tensile Test Methods, Polymer Engineering & Science, Jul. 1986, vol. 26, No. 13, pp. 962–968.

Brian R. Suddaby, Michael J. Short, and Thomas N. Thompson, SAE Technical Paper Series, Improvements in RIM Encapsulated Windows, Feb. 26–Mar. 2, 1990, 8 pages.

Anil B. Goel, New Hybrid Structural Adhesive for Reinforced Plastics, Feb. 2–6, 1987, 7 pages.

Structural bonding with polyurethane adhesives in high volume vehicle assemblies, date unknown, 2 pages.

Gurit Essex AG Beta Seal Betamate document, Jun. 1988, 136 pages.

M. Hermann and M. Rieder, Complete Systems for 1–Part, 2–Part Adhesive Technologies including the Pretreatment of Glass and Vehicle Bodies, and English translation, date unknown, 27 pages.

G. Sauer, Innovation auf dem Glassektor, 1988, 7 pages.

S. Driller, Verglasungssysteme Gummiverglasun bis Flash–Glazing, date unknown, 13 pages.

G. Teicher, Prüfung von Fahrzeugscheiben und Entwicklung neuer Prüfverfahren, date unknown, 9 pages.

H. Kunert, Glasherstellung im Wandel der Technik, date unknown, 5 pages.

S. Härdl, Anforderungen der Automobilindustrie an die Glashersteller–von der Projektdefinition bis zur Serle, date unknown, 11 pages.

B. Post, Technische Anforderungen an Sicherheitsglas und Verglasungswerkstoff im Rahmen nationaler und internationaler Gesetzgebung, date unknown, 6 pages.

K.H. Bruck, Fahrzeug–Verglasung, 1990, 8 pages.

Pau Rohrer and Robert Zilkens, Betamate (English Translation only), date unknown, 9 pages.

GM Stationary Glass Bonding Adhesive System Performance Requirements, GM3652M, Jun. 1992, 2 pages.

GM Zinc Coated Steel Sheet and Strip, Hot Dip Galvanized, GM6185M, Aug. 1993, 2 pages.

GM Performance of Substrates And/Or Coatings Through Environmental Cycling, GM9505P, Jul. 1988, 4 pages.

GM Knife Quick Adhesion Test For Stationary Glass Bonding Materials To Paint, GM9522P, Jan. 1992, 1 page.

GM Adhesion and Durability Of Exterior Trims, GM9758P, Nov. 1988, 3 pages.

GM Adhesion and Durability Of Bonded Weatherstrip–Pressure Sensitive Adhesive, GM9795P, Mar. 1990, 3 pages.

GM Cleavage Peel Test, GM9797P, Nov. 1988, 3 pages.

GM Electrodeposition Primer–Cathodic ELPO For Small Parts, 9984120, 1993, 1 page.

GM Adhesive, Twopart, Urethane, FRP, 9985454, Jun. 1992, 3 pages.

GM Adhesive, Two–Part, Polyurethane, Structural 9985786, Apr. 1992, 2 pages.

GM Adhesive, Two–Part, Polyurethane, Structural 9985787, Apr. 1992, 1 page.

GM Adhesive, Two–Part, Polyurethane, Structural 9985788, Apr. 1992, 2 pages.

Toyota Technical Instruction Sheet No. 01 204–01033, Apr. 21, 1992, 11 pages.

Toyota One–Component Urethane Adhesives For Glass Sub–Assembly Parts, TSK5515G, Jun. 1991, 21 pages.

Toyota Polyvinyl Chloride Materials For Stainless Steel Molding, TSM7607G, Oct. 1990, 18 pages.

Vista Suggested Processing Conditions for Vista Flexible PVC Comopunds, 1992, 4 pages.

Ashland Chemicals, Pliogrip Adhesive Systems for Structural Bonding, 1986, 16 pages.

Ford Engineering Material Specification, WSB–M11Pxx–A, 1 page, date unknown.

Chrysler Environmental, Health, and Occupational Safety Requirements For Regulated Substances Or Processes And Vehicle Recycling Reporting Requirements, CS–9003, Change B, Apr. 1993, 17 pages.

Chrysler Primer–Adhesion Promoter–Polyurethane Adhesive To Glass, MS–CF121, Change A, Jul. 1972, 4 pages.

Chrysler Primer–Blackout–Polyurethane To Glass–Windshield and Backlight Applications, MS–CF136, Change D, 7 pages, date unknown.

Chrysler Microcellular Polyurethane–High Density, MS–AY549, Change C, 9 pages, date unknown.

Chrysler Adhesive–Sealer Polyurethane Base–Room Temperature Moisture Curing Glass To Body Opening Applications, MS–CD910, Change A, Jul. 1972, 4 pages.

Chrysler Adhesive–Sealer–Polyurethane Base–Room Temperature Curing Windshield and Backlight Applications, MS–CD917, Change A, Jun. 1980, 10 pages.

Chrysler Glass–Safety–Heat Treated, MS–3694, Change T, Jun. 1990, 13 pages.

Chrysler Performance of Injection Molded TPU to Single Side of Fritted Tempered Glass, Apr. 1993, 3 pages.

Chrysler Encapsulated Glass Assembly Using TPU Material, No. PF–, 3 pages, date unknown.

Chrysler Tolerance Control Of Window Glass Parts And Glass–And–Frame Assemblies, PS–4468, Change B, Sep. 1981, 13 pages.

Chrysler Electrically Heated Backlight, PF–6071, Change C, Sep. 1981, 7 pages.

Chrysler Glass Assembly Using Urethane Adhesive, No. PF–, Apr. 1993, 7 pages.

Chrysler Bonding Of Windshield And Backlites To Body Opening With Adhesive/Sealer Polyurethane Base–Room Temperature Curing, PS–7103, Change E, Apr. 1993, 7 pages.

Chrysler Modular Window Air And Water Leak Test, PS–8461, Feb. 1987, 3 pages.

Photos provided by Pilkington allegedly showing a 1978 Corvette T–top; a 1990 GM 325 truck r/q swing–out; a 1990 F car T–top; and a 1991 GM 330 truck liftgate.

* cited by examiner

US 5,704,173 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12 are determined to be patentable as amended.

Claims 2–11 and 13–25, dependent on an amended claim, are determined to be patentable.

New claims 26–51 are added and determined to be patentable.

1. A hinged window assembly for use in a vehicle, the window assembly adapted to be mounted in a window opening in a vehicle body, said assembly comprising:
   a glass sheet having inner and outer surfaces terminating in a peripheral edge defining a shape to fit within the window opening, said sheet also including top and bottom edges and first and second end edges, said edges together defining said peripheral edge;
   a first substantially opaque coating on a predetermined portion of said inner sheet surface, said first opaque coating extending inwardly generally from said peripheral edge along at least portions thereof;
   a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;
   a latch mounting area at a location spaced from said hinge mounting area, and a second substantially opaque coating included on said inner sheet surface on said latch mounting area;
   a latch mount bonded to said second opaque coating on said latch mounting area, said latch mount being of the type adapted to receive a mechanism for moving said glass sheet between said open and closed positions;
   an adhesive between said second opaque coating and said latch mount, said adhesive bonding said latch mount to said second opaque coating such that there is no exposure of said latch mount on said outer surface of said sheet;
   said latch mount, when mounted on said latch mounting area, being substantially hidden from view from the outer surface of said glass sheet by said second opaque coating; *and*
   *wherein said latch mount comprises a mounting flange having at least three projections disposed inboard of a periphery of said mounting flange, and wherein said at least three projections are arranged in a non-linear configuration.*

12. [The] *A* hinged window assembly [of claim 1] *for use in a vehicle, the window assembly adapted to be mounted in a window opening in a vehicle body, said assembly comprising:*
   *a glass sheet having inner and outer surfaces terminating in a peripheral edge defining a shape to fit within the window opening, said sheet also including top and bottom edges and first and second end edges, said edges together defining said peripheral edge;*
   *a first substantially opaque coating on a predetermined portion of said inner sheet surface, said first opaque coating extending inwardly generally from said peripheral edge along at least portions thereof;*
   *a hinge mounted area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;*
   *a latch mounting area at a location spaced from said hinge mounting area, and a second substantially opaque coating included on said inner sheet surface on said latch mounting area;*
   *a latch mount bonded to said second opaque coating on said latch mounting area, said latch mount being of the type adapted to receive a mechanism for moving said glass sheet between said open and closed positions;*
   *an adhesive between said second opaque coating and said latch mount, said adhesive bonding said latch mount to said second opaque coating such that there is no exposure of said latch mount on said outer surface of said sheet;*
   *said latch mount, when mounted on said latch mounting area, being substantially hidden from view from the outer surface of said glass sheet by said second opaque coating;*
   wherein said latch mount [has at least one projection] *comprises a mounting flange having at least three projections* for spacing said latch mount from said second opaque coating, *said at least three projections being disposed inboard of a periphery of said mounting flange and arranged in a non-linear configuration,* said adhesive between said second opaque coating and said latch mount having a thickness defined by said [projection] *projections*.

26. *A hinged window assembly for use in a vehicle, the window assembly adapted to be mounted in a window opening in a vehicle body, said assembly comprising:*
   *a glass sheet having inner and outer surfaces terminating in a peripheral edge defining a shape to fit within the window opening, said sheet also including top and bottom edges and first and second end edges, said edges together defining said peripheral edge;*
   *a first substantially opaque coating on a predetermined portion of said inner sheet surface, said first opaque coating extending inwardly generally from said peripheral edge along at least portions thereof;*
   *a hinge mounting area adjacent one edge portion of said peripheral edge, said first opaque coating being included on said hinge mounting area, said hinge mounting area receiving a hinge member on said first opaque coating for hingedly securing said glass sheet in the window opening for movement between open and closed positions;* a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating; and wherein said hinge member and said latch mount respectively comprise a metallic flange having a plurality of projections, said projections extending from said metallic flange by a distance on the order of at least 0.1 mm for establishing a minimum spacing of a bonding surface of said metallic flange from said glass sheet, said plurality of projections of said metallic flange comprising at least first, second and third embossments embossed inboard of a perimeter edge of said metallic flange, said first and second embossments being disposed along an interconnecting axis and said third embossment being disposed off of said axis, said first, second and third embossments generally disposed triangular one to another.

27. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

wherein said bonding of said hinge member to said glass sheet forms a hinge member bonding joint, said hinge member bonding joint capable of withstanding a straight pull test of about 150 pounds at a rate of about 25 millimeters per minute after soaking said window assembly in 80 degrees C. water for 100 hours;

a latch mounting area at a location spaced from said hinge mounting area, and a second substantially opaque coating included on said inner sheet surface on said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said bonding of said latch mount to said glass sheet forms a latch bonding joint, said latch bonding joint being sufficiently strong to withstand a straight pull test of about 150 pounds at a rate of about 25 millimeters per minute after soaking said window assembly in 80 degrees C. water for 100 hours;

wherein said hinge member and said latch mount respectively comprise a metallic flange having a plurality of projections, said projections extending from said metallic flange by a distance on the order of at least 0.1 mm for establishing a minimum spacing of a bonding surface of said metallic flange from said glass sheet, said plurality of projections of said metallic flange comprising at least first, second and third projections disposed inboard of a perimeter edge of said metallic flange, said first and second projections being disposed along an interconnecting axis and said third projection being disposed off of said axis; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

28. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet such that a central viewing area is defined by said peripheral frit layer;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member;

at least one adhesion-promoting primer between said first opaque coating and said adhesive bonding said hinge member at said glass sheet, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

said hinge member comprising a mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of said mounting flange, said first and second embossments being disposed along an interconnecting axis and said third embossment being disposed off of said axis;

wherein said bonding of said hinge member to said glass sheet forms a hinge member bonding joint, said hinge member bonding joint capable of withstanding a straight pull test of about 250 pounds after soaking said window assembly in 80 degrees C. water for 240 hours, said hinge member bonding joint being sufficiently strong such that when a load sufficient to induce failure is imposed between said hinge member and said glass sheet, failure occurs other than in the adhesive bond interface between said hinge member and said glass sheet;

a latch mounting area at a location spaced from said hinge mounting area, and a second substantially opaque coating included on said inner sheet surface on said latch mounting area, wherein at least a portion of said second opaque coating is located within said central viewing area;

a metallic latch mount bonded to said second opaque coating on said latch mounting area, said latch mount being of the type adapted to receive a mechanism for moving said glass sheet between said open and closed positions;

an adhesive between said second opaque coating and said latch mount;

at least one adhesion-promoting primer between said second opaque coating and said adhesive bonding said latch mount at said glass sheet, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

said latch mount comprising a latch mounting flange having a plurality of projections comprising embossments formed by stamping the metal used in the forming of said latch mounting flange, said embossments extending from said latch mounting flange by a distance on the order of at least 0.1 mm for establishing a minimum spacing of a bonding surface of said latch mounting flange of said latch mount from said second opaque coating of said glass sheet, said plurality of embossments comprising at least fourth, fifth and sixth embossments embossed inboard of a perimeter edge of said latch mounting flange, said fourth and fifth embossments being disposed along an interconnecting axis and said sixth embossment being disposed off of said axis;

wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours, said latch bonding joint being sufficiently strong such that when a load sufficient to induce failure is imposed between said latch mount and said glass sheet, failure occurs other than in the adhesive bond interface between said latch mount and said glass sheet; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

29. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;

a hinge mounting area adjacent an edge portion of said peripheral edge, said first opaque coating being included on said hinge mounting area;

a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;

at least one adhesion-promoting primer applied to said first opaque coating at said hinge mounting area;

an adhesive between said first opaque coating and said mounting flanges of said hinge members, said adhesive bonding said hinge members to said first opaque coating such that there is no exposure of said hinge members on said outer surface of said glass sheet;

said hinge members adapted for bonding at said first opaque coating, each said mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating included on said inner sheet surface on said latch mounting area, wherein said second opaque coating comprises a ceramic frit layer fused to said glass sheet;

at least one adhesion-promoting primer applied to said second opaque coating at said latch mounting area;

a metalllic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount by a distance on the order of at least 0.1 mm for establishing a minimum spacing of a bonding surface of said mounting flange of said latch mount from said second opaque coating of said glass sheet, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another; and wherein said bonding of said latch mount to said glass sheet forms a latch bonding joint, said latch bonding joint being sufficiently strong to withstand a straight pull tensional load of about 250 pounds after immersion of said window assembly in 80 degress C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degrees C. water for 240 hours.

30. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;

a hinge mounting area adjacent an edge portion of said peripheral edge, said first opaque coating being included on said hinge mounting area;

a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;

at least one adhesion-promoting primer applied to said first opaque coating at said hinge mounting area;

an adhesive between said first opaque coating and said mounting flanges of said hinge members, said adhesive bonding said hinge members to said first opaque coating such that there is no exposure of said hinge members on said outer surface of said glass sheet;

said hinge members adapted for bonding at said first opaque coating, each said mounting flange having a plurality of projections comprising embossments formed by stamping the metal used in the forming of said mounting flange, said embossments extending from said mounting flange for establishing a minimum spacing of a bonding surface of said mounting flange of said hinge member from said first opaque coating of said glass sheet, and wherein said embossments extend from said mounting flange of each of said hinge members to establish a bond-line thickness of the adhesive that is on the order of at least about 1 mm thick and less than 3 mm thick, said plurality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating included on said inner sheet surface on said latch mounting area, wherein said second opaque coating comprises a ceramic frit layer fused to said glass sheet;

at least one adhesion-promoting primer applied to said second opaque coating at said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount for establishing a minimum spacing of a bonding surface of said mounting flange of said latch mount from said second opaque coating of said glass sheet, and wherein said embossments extend from said mounting flange of said latch mount to establish a bond-line thickness of the adhesive that is on the order of at least about 1 mm thick and less than 3 mm thick, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another; and wherein said bonding of said latch mount to said glass sheet forms a latch bonding joint, said latch bonding joint being sufficiently strong to withstand a straight pull tensional load of about 250 pounds after immersion of said window assembly in 80 degrees C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degress C. water for 240 hours.

31. A hinged window assembly for use in a vehicle the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration;

wherein said bonding of said latch mount to said sheet forms a joint, said joint being sufficiently strong to withstand a straight pull test of about 150 pounds at a rate of about 25 millimeters per minute;

wherein said joint withstands said pull test after soaking said panel assembly in 80 degrees C. water for at least 100 hours;

said window assembly further comprising an adhesion-promoting primer between said second opaque coating and said adhesive bonding said latch mount to said sheet; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

32. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration, said projections extending from said mounting flange by a distance on the order of at least 0.1 mm for establishing a minimum spacing of a bonding surface of said mounting flange from said glass sheet;

wherein said bonding of said latch mount to said sheet forms a joint, said joint being sufficiently strong to withstand a straight pull test of about 150 pounds at a rate of about 25 millimeters per minute;

wherein said joint withstands said pull test after soaking said panel assembly in 80 degrees C. water for at least 100 hours;

said window assembly further comprising an adhesion-promoting primer between said second opaque coating and said adhesive bonding said latch mount to said sheet; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

33. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration, said projections extending from said mounting flange for establishing a minimum spacing of a bonding surface of said mounting flange from said glass sheet;

wherein said bonding of said latch mount to said sheet forms a joint, said joint being sufficiently strong to withstand a straight pull test of about 150 pounds at a rate of about 25 millimeters per minute;

wherein said joint withstands said pull test after soaking said panel assembly in 80 degrees C. water for at least 100 hours;

said window assembly further comprising an adhesion-promoting primer between said second opaque coating and said adhesive bonding said latch mount to said sheet;

wherein said projections extend from said mounting flange to establish a bond-line thickness of the adhesive that is on the order of about 1 mm thick; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

34. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also included top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration, said projections extending from said mounting flange by a distance on the order of at least 0.1 mm for establishing a minimum spacing of a bonding surface of said mounting flange from said glass sheet;

at least one adhesion-promoting primer between said second opaque coating and said adhesive bonding said latch mount at said glass sheet;

wherein said latch mount is formed of metal; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

35. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours.

36. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration, and wherein said projections extend from said mounting flange to establish a bond-line thickness of the adhesive that is greater than 0.1 mm thick and less than 3 mm thick;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said bonding of said latch mount to said glass sheet forms a latch bonding joint, said latch bonding joint being sufficiently strong to withstand a straight pull test of about 150 pounds at a rate of about 25 millimeters per minute after soaking said window assembly in 80 degrees C. water for 100 hours.

37. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edges, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a mounting flange having at least three projections disposed inboard of a periphery of said mounting flange, and wherein said at least three projections are arranged in a non-linear configuration, said projections extending from said mounting flange by a distance on the order of at least 0.1 mm for establishing a minimum spacing of a bonding surface of said mounting flange from said glass sheet;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body;

wherein said second opaque coating comprises a ceramic frit layer fused to said glass sheet; and wherein said window assembly includes at least one adhesion-promoting primer between said second opaque coating and said adhesive bonding said latch mount at said glass sheet.

38. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area adapted to receive a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said latch mount comprises a metallic mounting flange having at least three projections disposed inboard of a periphery of said mounting flange, and wherein said at least three projections are arranged in a non-linear configuration, said projections extending from said mounting flange by a distance on the order of 1 mm for establishing a minimum spacing of a bonding surface of said mounting flange from said glass sheet;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body;

wherein said second opaque coating comprises a ceramic frit layer fused to said glass sheet;

wherein said window assembly includes at least one adhesion-promoting primer between said second opaque coating and said adhesive bonding said latch mount at said glass sheet; and wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours.

39. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area receiving a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said hinge member and said latch mount respectively comprise a metallic flange having a plurality of projections, said projections extending from said metallic flange by a distance on the order of at least 0.1 mm for establishing a minimum spacing of a bonding surface of said metallic flange from said glass sheet, said plurality of projections of said metallic flange comprising at least first, second and third embossments embossed inboard of a perimeter edge of said metallic flange, said first and second embossments being disposed along an interconnecting axis and said third embossment being disposed off of said axis, said first, second and third embossments generally disposed triangular one to another;

wherein said bonding of said latch mount to said sheet forms a joint, said joint being sufficiently strong to withstand a straight pull test of about 150 pounds at a rate of about 25 millimeters per minute;

wherein said joint withstands said pull test after soaking said panel assembly in 80 degrees C. water for at least 100 hours;

said window assembly further comprising an adhesion-promoting primer between said second opaque coating and said adhesive bonding said latch mount to said sheet;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said projections extend from said mounting flange to establish a bond-line thickness of the adhesive that is greater than 0.1 mm thick and less than 3 mm thick.

40. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area receiving a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said hinge member and said latch mount respectively comprise a metallic flange having a plurality of projections, said projections extending from said respective metallic flanges by a distance on the order of at least 0.1 mm for establishing a minimum spacing of a bonding surface of said metallic flange from said glass sheet, said plurality of projections of said metallic flange comprising at least first, second and third embossments embossed inboard of a perimeter edge of said metallic flange, said first and second embossments being disposed along an interconnecting axis and said third embossment being disposed off of said axis, said first, second and third embossments generally disposed triangular one to another;

said window assembly including at least one adhesion-promoting primer between said second opaque coating and said adhesive bonding said latch mount at said glass sheet; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

41. A hinged window assembly for use in a vehicle, the window assembly adapted to be mounted in a window opening in a vehicle body, said assembly comprising:

a glass sheet having inner and outer surfaces terminating in a peripheral edge defining a shape to fit within the window opening, said sheet also including top and bottom edges and first and second end edges, said edges together defining said peripheral edge;

a first substantially opaque coating on a predetermined portion of said inner sheet surface, said first opaque coating extending inwardly generally from said peripheral edge along at least portions thereof;

a hinge mounting area adjacent one edge portion of said peripheral edge, said first opaque coating being included on said hinge mounting area, said hinge mounting area receiving a hinge member on said first opaque coating for hingedly securing said glass sheet in the window opening for movement between open and closed positions;

a latch mounting area at a location spaced from said hinge mounting area, and a second substantially opaque coating included on said inner sheet surface on said latch mounting area;

a latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said hinge member and said latch mount respectively comprise a metallic flange having a plurality of projections, said projections extending from said metallic flange by a distance on the order of 1 mm for establishing a minimum spacing of a bonding surface of said metallic flange from said glass sheet, said plurality of projections of said metallic flange comprising at least first, second and third embossments inboard of a perimeter edge of said metallic flange, said first and second embossments being disposed along an interconnecting axis and said third embossment being disposed off of said axis, said first, second and third embossments generally disposed triangular one to another;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours.

42. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprises a frit layer fused to portions of said inner glass sheet surface adjacent to said peripheral edge of said glass sheet;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening from movement between open and closed positions, said hinge member being formed of metal and E-coated;

an adhesive between said first opaque coating and said hinge member, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

a latch mounting area at a location spaced from said hinge mounting area, and a second substantially opaque coating included on said inner sheet surface on said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said hinge member and said latch mount respectively comprise a metallic flange having a plurality of projections, said projections extending from said metallic flange by a distance on the order of at least 0.1 mm for establishing a minimum spacing of a bonding surface of said metallic flange from said glass sheet, said plurality of projections of said metallic flange comprising at least first, second and third projections disposed inboard of a perimeter edge of said metallic flange, said first and second projections being disposed along an interconnecting axis and said third projection being disposed off of said axis;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and said window assembly including at least one adhesion-promoting primer between said second opaque coating and said adhesive bonding said latch mount at said glass sheet.

43. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet;

a hinge mounting area adjacent one edge portion of said peripheral edge, said first opaque coating being included on said hinge mounting area;

a hinge member bonded to first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

wherein said bonding of said hinge member to said glass sheet forms a hinge member bonding joint, said hinge member bonding joint capable of withstanding a straight pull test of about 150 pounds at a rate of about 25 millimeters per minute after soaking said window assembly in 80 degrees C. water for 100 hours;

a latch mounting area at a location spaced from said hinge mounting area, and a second substantially opaque coating included on said inner sheet surface on said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said bonding of said latch mount to said glass sheet forms a latch bonding joint, said latch bonding joint being sufficiently strong to withstand a straight pull test of about 150 pounds at a rate of about 25 millimeters per minute after soaking said window assembly in 80 degrees C. water for 100 hours;

wherein said hinge member and said latch mount respectively comprise a metallic flange having a plurality of projections, said projections extending from said metallic flange by a distance on the order of at least 0.1 mm for establishing a minimum spacing of a bonding surface of said metallic flange from said glass sheet, said plurality of projections of said metallic flange comprising at least first, second and third projections disposed inboard of a perimeter edge of said metallic flange, said first and second projections being disposed along an interconnecting axis and said third projection being disposed off of said axis;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said projections extend from said respective metallic flanges to establish a bond-line thickness of the adjesive that is on the order of about 1 mm thick.

44. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

wherein said bonding of said hinge member to said glass sheet forms a hinge member bonding joint, said hinge member bonding joint capable of withstanding a straight pull test of about 150 pounds at a rate of about 25 millimeters per minute after soaking said window assembly in 80 degrees C. water for 100 hours;

a latch mounting area at a location spaced from said hinge mounting area, and a second substantially opaque coating included on said inner sheet surface on said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said bonding of said latch mount to said glass sheet forms a latch bonding joint, said latch bonding joint being sufficiently strong to withstand a straight pull test of about 150 pounds at a rate of about 25 millimeters per minute after soaking said window assembly in 80 degrees C. water for 100 hours;

wherein said hinge member and said latch mount respectively comprise a metallic flange having a plurality of projections, said projections extending from said metallic flange by a distance on the order of 1 mm for establishing a minimum spacing of a bonding surface of said metallic flange from said glass sheet, said plurality of projections of said metallic flange comprising at least first, second and third projections disposed inboard of a perimeter edge of said metallic flange, said first and second projections being disposed along an interconnecting axis and said third projection being disposed off of said axis;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body;

wherein said second opaque coating comprises a ceramic frit layer fused to said glass sheet; and wherein said window assembly includes at least one adhesion-promoting primer between said second opaque coating and said adhesive bonding said latch mount at said glass sheet.

45. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet such that a central viewing area is defined by said peripheral frit layer;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member;

at least one adhesion-promoting primer between said first opaque coating and said adhesive bonding said hinge member at said glass sheet, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

said hinge member comprising a mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of said mounting flange, said first and second embossments being disposed along an interconnecting axis and said third embossment being disposed off of said axis;

wherein said bonding of said hinge member to said glass sheet forms a hinge member bonding joint, said hinge member bonding joint capable of withstanding a straight pull test of about 250 pounds after soaking said window assembly in 80 degrees C. water for 240 hours, said hinge member bonding joint being sufficiently strong such that when a load sufficient to induce failure is imposed between said hinge member and said glass sheet, failure occurs other than in the adesive bond interface between said hinge member and said glass sheet;

a latch mounting area at a location spaced from said hinge mounting area, and a second substantially opaque coating included on said inner sheet surface on said latch mounting area, wherein at least a portion of said second opaque coating is located within said central viewing area;

a metallic latch mount bonded to said second opaque coating on said latch mounting area, said latch mount being of the type adapted to receive a mechanism for moving said glass sheet between said open and closed positions;

an adhesive between said second opaque coating and said latch mount;

at least one adhesion-promoting primer between said second opaque coating and said adhesive bonding said latch mount at said glass sheet, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

said latch mount comprising a latch mounting flange having a plurality of projections comprising embossments formed by stamping the metal used in the forming of said latch mounting flange, said embossments extending from said latch mounting flange by a distance on the order of at least 0.1 mm for establishing a minimum spacing of a bonding surface of said latch mounting flange of said latch mount from said second opaque coating of said glass sheet, said plurality of embossments comprising at least fourth, fifth and sixth embossments embossed inboard of a perimeter edge of said latch mounting flange, said fourth and fifth embossments being disposed along an interconnecting axis and said sixth embossment being disposed off of said axis;

wherein said bonding of said latch mount to said glass sheet forms a latch bonding joint, said latch bonding being sufficiently strong to withstand a straight pull test of about 250 pounds after soaking said window assembly in 80 degrees C. water for 240 hours, said latch bonding joint being sufficiently strong such that when a load sufficient to induce failure is imposed between said latch mount and said glass sheet, failure occurs other than in the adhesive bond interface between said latch mount and said glass sheet;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body; and wherein said embossments extend from said latch mounting flange to establish a bond-line thickness of the adhesive that is greater than 0.1 mm thick and less than 3 mm thick.

46. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet such that a central viewing area is defined by said peripheral frit layer;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member;

at least one adhesion-promoting primer between said first opaque coating and said adhesive bonding said hinge member at said glass sheet, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

said hinge member comprising a mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of said mounting flange, said first and second embossments being disposed along an interconnecting axis and said third embossment being disposed off of said axis;

wherein said bonding of said hinge member to said glass sheet forms a hinge member bonding joint, said hinge member bonding joint capable of withstanding a straight pull test of about 250 pounds after soaking said window assembly in 80 degrees C. water for 240 hours, said hinge member bonding joint being sufficiently strong such that when a load sufficient to induce failure is imposed between said hinge member and said glass sheet, failure occurs other than in the adhesive bond interface between said hinge member and said glass sheet;

a latch mounting area at a location spaced from said hinge mounting area, and a second substantially opaque coating included on said inner sheet surface on said latch mounting area, wherein at least a portion of said second opaque coating is located within said central viewing area;

a metallic latch mount bonded to said second opaque coating on said latch mounting area, said latch mount being of the type adapted to receive a mechanism for moving said glass sheet between said open and closed positions;

an adhesive between said second opaque coating and said latch mount;

at least one adhesion-promoting primer between said second opaque coating and said adhesive bonding said latch mount at said glass sheet, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

said latch mount comprising a latch mounting flange having a plurality of projections comprising embossments formed by stamping the metal used in the forming of said latch mounting flange, said embossments extending from said latch mounting flange by a distance on the order of at least 0.1 mm for establishing a minimum spacing of a bonding surface of said latch mounting flange of said latch mount from said second opaque coating of said glass sheet, said plurality of embossments comprising at least fourth, fifth and sixth embossments embossed inboard of a perimeter edge of said latch mounting flange, said fourth and fifth embossments being disposed along an interconnecting axis and said sixth embossment being disposed off of said axis;

wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours, said latch bonding joint being sufficiently strong such that when a load sufficient to induce failure is imposed between said latch mount and said glass sheet, failure occurs other than in the adhesive bond interface between said latch mount and said glass sheet;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body;

wherein said embossments extend from said mounting flange of said hinge member to establish a bond-line thickness of the adhesive that is greater than 0.1 mm thick and less than 3 mm thick; and wherein said embossments extend from said mounting flange of said latch mount to establish a bond-line thickness of the adhesive that is greater than 0.1 mm thick and less than 3 mm thick.

47. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a frit layer fused to portions of said inner glass sheet surface adjacent to said peripheral edge of said glass sheet such that a central viewing area is defined by said peripheral frit layer;

a hinge mounting area adjacent one edge portion of said peripheral edge, said first opaque coating being included on said hinge mounting area;

a hinge member bonded to said first opaque coating at said hinge mounting area, said hinge mounting area adapted to receive said hinge member on said first opaque coating for hingedly securing said glass sheet in the window opening for movement between open and closed positions, said hinge member being formed of metal and E-coated;

an adhesive between said first opaque coating and said hinge member;

at least one adhesion-promoting primer between said first opaque coating and said adhesive bonding said hinge member at said glass sheet, said adhesive bonding said hinge member to said first opaque coating such that there is no exposure of said hinge member on said outer surface of said glass sheet, said hinge member, when mounted on said hinge mounting area, being substantially hidden from view from the outer surface of said glass sheet by said first opaque coating;

said hinge member comprising a mounting flange having a plurality of projections comprising embossments formed by stamping the metal used in the forming of said mounting flange, said embossments extending from said mounting flange by a distance on the order of 1 mm for establishing a minimum spacing of a bonding surface of said mounting flange of said hinge member from said first opaque coating of said glass sheet, said plurality of embossments comprising at least first, second and third embossments embossed inboard of a perimeter edge of said mounting flange, said first and second embossments being disposed along an interconnecting axis and said third embossment being disposed off of said axis;

wherein said bonding of said hinge member to said glass sheet forms a hinge member bonding joint, said hinge member bonding joint capable of withstanding a straight pull test of about 250 pounds after soaking said window assembly in 80 degrees C. water for 240 hours, said hinge member bonding joint being sufficiently strong such that when a load sufficient to induce failure is imposed between said hinge member and said glass sheet, failure occurs other than in the adhesive bond interface between said hinge member and said glass sheet;

a latch mounting area at a location spaced from said hinge mounting area, and a second substantially opaque coating included on said inner sheet surface on said latch mounting area, wherein at least a portion of said second opaque coating is located within said central viewing area, wherein said second opaque coating comprises a ceramic frit layer fused to said glass sheet;

a metallic latch mount bonded to said second opaque coating on said latch mounting area, said latch mount being of the type adapted to receive a mechanism for moving said glass sheet between said open and closed positions;

an adhesive between said second opaque coating and said latch mount;

at least one adhesion-promoting primer between said second opaque coating and said adhesive bonding said latch mount at said glass sheet, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

said latch mount comprising a latch mounting flange having a plurality of projections comprising embossments formed by stamping the metal used in the forming of said latch mounting flange, said embossments extending from said latch mounting flange by a distance on the order of 1 mm for establishing a minimum spacing of a bonding surface of said latch mounting flange of said latch mount from said second opaque coating of said glass sheet, said plurality of embossments comprising at least fourth, fifth and sixth embossments embossed inboard of a perimeter edge of said latch mounting flange, said fourth and fifth embossments being disposed along an interconnecting axis and said sixth embossment being disposed off of said axis;

wherein said bonding of said latch mount to said glass sheet forms a latch bonding joint, said latch bonding joint being sufficiently strong to withstand a straight pull test of about 250 pounds after soaking said window assembly in 80 degrees C. water for 240 hours, said latch bonding joint being sufficiently strong such that when a load sufficient to induce failure is imposed between said latch mount and said glass sheet, failure occurs other than in the adhesive bond interface between said latch mount and said glass sheet; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

48. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;

a hinge mounting area adjacent an edge portion of said peripheral edge, said first opaque coating being included on said hinge mounting area;

a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;

at least one adhesion-promoting primer applied to said first opaque coating at said hinge mounting area;

an adhesive between said first opaque coating and said mounting flanges of said hinge members, said adhesive bonding said hinge members to said first opaque coating such that there is no exposure of said hinge members on said outer surface of said glass sheet;

said hinge members adapted for bonding at said first opaque coating, each said mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating included on said inner sheet surface on said latch mounting area, wherein said second opaque coating comprises a ceramic frit layer fused to said glass sheet;

at least one adhesion-promoting primer applied to said second opaque coating at said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount by a distance on the order of at least 0.1 mm for establishing a minimum spacing of a bonding surface of said mounting flange of said latch mount from said second opaque coating of said glass sheet, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another;

wherein said bonding of said latch mount to said glass sheet forms a latch bonding joint, said latch bonding joint being sufficiently strong to withstand a straight pull tensional load of about 250 pounds after immersion of said window assembly in 80 degrees C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degrees C. water for 240 hours;

wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body;

wherein said embossments extend from said mounting flange of said latch mount to establish a bond-line thickness of the adhesive that is greater than 0.1 mm thick and less than 3 mm thick; and wherein said embossments extend from said mounting flanges of said hinge members to establish a bond-line thickness of the adhesive that is greater than 0.1 mm thick and less than 3 mm thick.

49. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;

a hinge mounting area adjacent an edge portion of said peripheral edge, said first opaque coating being included on said hinge mounting area;

a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;

at least one adhesion-promoting primer applied to said first opaque coating at said hinge mounting area;

an adhesive between said first opaque coating and said mounting flanges of said hinge members, said adhesive bonding said hinge members to said first opaque coating such that there is no exposure of said hinge members on said outer surface of said glass sheet;

said hinge members adapted for bonding at said first opaque coating, each said mounting flange having a plurality of projections comprising embossments formed by stamping the metal used in the forming of said mounting flange, said embossments extending from said mounting flange by a distance on the order of at least 0.1 mm for establishing a minimum spacing of a bonding surface of said mounting flange of said hinge member from said first opaque coating of said glass sheet, said plurality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating including on said inner sheet surface on said latch mounting area, wherein said second opaque coating comprises a ceramic frit layer fused to said glass sheet;

at least one adhesion-promoting primer applied to said second opaque coating at said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount by a distance on the order of at least 0.1 mm for establishing a minimum spacing of a bonding surface of said mounting flange of said latch mount from said second opaque coating of said glass sheet, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another;

wherein said bonding of said latch mount to said glass sheet forms a latch bonding joint, said latch bonding joint being sufficiently strong to withstand a straight pull tensional load of about 250 pounds after immersion of said window assembly in 80 degrees C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degrees C. water for 240 hours; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

50. *A hinged window assembly for use in a vehicle, said window assembly adapted to be mounted in a window opening in a vehicle body, said window assembly comprising:*

*a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;*

*a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;*

*a hinge mounting area adjacent an edge portion of said peripheral edge, said first opaque coating being included on said hinge mounting area;*

*a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;*

*at least one adhesion-promoting primer applied to said first opaque coating at said hinge mounting area;*

*an adhesive between said first opaque coating and said mounting flanges of said hinge members, said adhesive bonding said hinge members to said first opaque coating such that there is no exposure of said hinge members on said outer surface of said glass sheet;*

*said hinge members adapted for bonding at said first opaque coating, each said mounting flange having a plurality of projections comprising embossments formed by stamping the metal used in the forming of said mounting flange, said embossments extending from said mounting flange by a distance on the order of 1 mm for establishing a minimum spacing of a bonding surface of said mounting flange of said hinge member from said first opaque coating of said glass sheet, said plu-* rality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating included on said inner sheet surface on said latch mounting area, wherein said second opaque coating comprises a ceramic frit layer fused to said glass sheet;

at least one adhesion-promoting primer applied to said second opaque coating at said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount by a distance on the order of 1 mm for establishing a minimum spacing of a bonding surface of said mounting flange of said latch mount from said second opaque coating of said glass sheet, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another;

wherein said bonding of said latch mount to said glass sheet forms a latch bonding joint, said latch bonding joint being sufficiently strong to withstand a straight pull tensional load of about 250 pounds after immersion of said window assembly in 80 degrees C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degrees C. water for 240 hours; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

51. A hinged window assembly for use in a vehicle, said window assembly adapted to be mounted in a window opening in a vehicle body, said window assembly comprising:

a glass sheet having inner and outer surfaces terminating in a peripheral edge defining a shape to fit within the window opening, said sheet also including top and bottom edges and first and second end edges, said edges together defining said peripheral edge, wherein said glass sheet outer surface has a surface area of at least 250 square inches, and wherein said glass sheet is oriented generally vertically when said window assembly is mounted in a window opening in the vehicle body;

a first substantially opaque coating on a predetermined portion of said inner sheet surface, said first opaque coating extending inwardly generally from said peripheral edge along at least portions thereof, said first opaque coating comprising a ceramic frit layer fused to said glass sheet adjacent to said peripheral edge of said glass sheet;

a hinge mounting area adjacent an edge portion of said peripheral edge, said first opaque coating being included on said hinge mounting area;

a pair of spaced apart metallic hinge members, said hinge mounting area adapted to receive said hinge members on said first opaque coating for hingedly securing said glass sheet in the window opening for movement between open and closed positions, each of said hinge members comprising a mounting flange formed of metal and E-coated;

at least one adhesion-promoting primer applied to said first opaque coating at said hinge mounting area;

an adhesive between said first opaque coating and said mounting flanges of said hinge members, said adhesive bonding said hinge members to said first opaque coating such that there is no exposure of said hinge members on said outer surface of said glass sheet;

said hinge members adapted for bonding at said first opaque coating, each said mounting flange having a plurality of projections comprising embossments formed by stamping the metal used in the forming of said mounting flange, said embossments extending from said mounting flange by a distance on the order of 1 mm for establishing a minimum spacing of a bonding surface of said mounting flange of said hinge member from said first opaque coating of said glass sheet, and wherein said embossments extend from said mounting flange of each of said hinge members to establish a bond-line thickness of the adhesive that is on the order of at least about 1 mm thick and less than 3 mm thick, said plurality of embossments comprising at least first, second and third embossments embossed inboard of a perimeter edge of each said mounting flange, said first and second embossments being disposed along an interconnecting axis and said third embossment being disposed off of said axis, said first, second and third embossments generally disposed triangular one to another;

a latch mounting area at a location spaced from said hinge mounting area, and a second substantially opaque coating included on said inner sheet surface on said latch mounting area, wherein said second opaque coating comprises a ceramic frit layer fused to said glass sheet;

at least one adhesion-promoting primer applied to said second opaque coating at said latch mounting area;

a metallic latch mount bonded to said second opaque coating on said latch mounting area, said latch mount being of the type adapted to receive a mechanism for moving said glass sheet between said open and closed positions;

an adhesive between said second opaque coating and a metallic mounting flange of said latch mount, said adhesive bonding said latch mount to said second opaque coating such that there is no exposure of said latch mount on said outer surface of said sheet;

said latch mount, when mounted on said latch mounting area, being substantially hidden from view from the outer surface of said glass sheet by said second opaque coating;

wherein said mounting flange of said latch mount has a plurality of projections comprising embossments formed by stamping the metal used in the forming of said mounting flange, said embossments extending from said mounting flange of said latch mount by a distance on the order of 1 mm for establishing a minimum spacing of a bonding surface of said mounting flange of said latch mount from said second opaque coating of said glass sheet, and wherein said embossments extend from said mounting flange of said latch mount to establish a bond-line thickness of the adhesive that is on the order of at least about 1 mm thick and less than 3 mm thick, said plurality of embossments of said mounting flange of said latch mount comprising at least fourth, fifth and sixth embossments embossed inboard of a perimeter edge of said mounting flange of said latch mount, said fourth and fifth embossments being disposed along an interconnecting axis thereof and said sixth embossment being disposed off of said axis, said fourth, fifth and sixth embossments generally disposed triangular one to another;

wherein said bonding of said latch mount to said glass sheet forms a latch bonding joint, said latch bonding joint being sufficiently strong to withstand a straight pull tensional load of about 250 pounds after immersion of said window assembly in 80 degrees C. water for 240 hours, and wherein said bonding of said metallic hinge members to said glass sheet forms hinge member bonding joints, said hinge member bonding joints being sufficiently strong to withstand a straight pull tensional load of about 250 pounds after immersion of said panel assembly in 80 degrees C. water for 240 hours; and wherein said window assembly comprises one of (a) a side window assembly for pivoting said glass sheet about a generally vertical axis proximate a leading edge of said glass sheet with respect to a forward direction of travel of the vehicle when said window assembly is mounted in a side window opening in the vehicle body, and (b) a rear liftgate window assembly for pivoting said glass sheet about a generally horizontal axis proximate said top edge of said glass sheet when said window assembly is mounted in a rear window opening in the vehicle body.

\* \* \* \* \*

(12) EX PARTE REEXAMINATION CERTIFICATE (7506th)
United States Patent
Repp et al.

(10) Number: US 5,704,173 C2
(45) Certificate Issued: *May 11, 2010

(54) HINGED WINDOW ASSEMBLY

(75) Inventors: R. Scott Repp, Holland, MI (US); Pamela M. Stallman, Lawton, MI (US)

(73) Assignee: Magna Donnelly Corporation, Holland, MI (US)

Reexamination Request:
No. 90/010,345, Nov. 21, 2008

Reexamination Certificate for:
Patent No.: 5,704,173
Issued: Jan. 6, 1998
Appl. No.: 08/659,269
Filed: Jun. 6, 1996

Reexamination Certificate C1 5,704,173 issued Aug. 26, 2008

(*) Notice: This patent is subject to a terminal disclaimer.

Related U.S. Application Data

(63) Continuation of application No. 08/129,671, filed on Sep. 30, 1993, now Pat. No. 5,551,197.

(51) Int. Cl.
*E05D 7/00* (2006.01)
*B60J 1/00* (2006.01)
*B60J 1/12* (2006.01)
*B60J 1/14* (2006.01)

(52) U.S. Cl. .................. 52/204.62; 52/204.69; 52/208; 296/201; 156/108

(58) Field of Classification Search .......... None
See application file for complete search history.

(56) References Cited

U.S. PATENT DOCUMENTS

| | | |
|---|---|---|
| 226,770 A | 4/1880 | Morse |
| 1,963,941 A | 6/1934 | Duffy |
| 2,253,818 A | 8/1941 | Simpson |
| 2,390,260 A | 12/1945 | King |
| 2,502,970 A | 4/1950 | Manning |
| 2,507,965 A | 5/1950 | Richner |
| 2,555,204 A | 5/1951 | Sorrell |
| 2,592,411 A | 4/1952 | Prohnapel |
| 2,608,926 A | 9/1952 | Helsley |
| 2,617,481 A | 11/1952 | Prohnapel |

(Continued)

FOREIGN PATENT DOCUMENTS

| | | |
|---|---|---|
| DE | 1902498 | 8/1970 |
| DE | 7520034 U | 11/1975 |
| DE | 2840811 | 4/1980 |
| DE | 3044614 | 7/1982 |
| DE | 3246396 | 12/1982 |

(Continued)

OTHER PUBLICATIONS

Hackh, Ingo W.D., 1890–1938, Grant & Hackh's Chemical Dictionary, Rev. ed. of Chemical Dictionary 4th edition, 1969.

(Continued)

*Primary Examiner*—Jeffrey R. Jastrzab

(57) ABSTRACT

A flush-mounted articulated window assembly for use in a vehicle, the window assembly adapted to be mounted in a window opening such that, when closed, it is generally flush with the exterior surface of the vehicle. The window assembly includes a transparent sheet with at least one window-mounting member bonded by two separate adhesives to an inner surface of the sheet. The mounting member includes projections which space the mounting member from the inner sheet surface, and/or perforations which allow air and moisture to reach the space provided between the mounting member and the inner sheet surface. A first adhesive temporarily fixtures the mounting member to the sheet. A second adhesive permanently bonds the mounting member to the inner sheet surface. The bond created is sufficiently strong such that application of a load sufficient to cause a failure results in a failure other than in the adhesion of the adhesive to the mounting member and the panel.

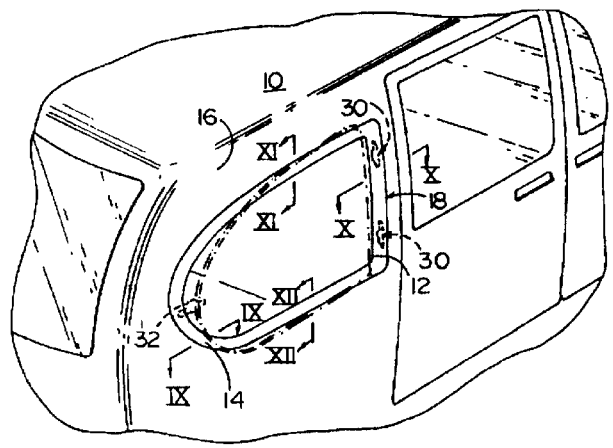

U.S. PATENT DOCUMENTS

| | | |
|---|---|---|
| 2,679,201 A | 5/1954 | Scharmen |
| 2,738,838 A | 3/1956 | Sutter |
| 2,829,081 A | 4/1958 | Sweem |
| 2,948,015 A | 8/1960 | Hansen |
| 2,996,221 A | 8/1961 | Grise |
| 3,032,808 A | 5/1962 | Fleming |
| 3,052,496 A | 9/1962 | Prey |
| 3,282,014 A * | 11/1966 | Bamford et al. ............... 52/627 |
| 3,343,867 A | 9/1967 | Couch et al. |
| 3,427,770 A | 2/1969 | Kunert et al. |
| 3,448,486 A | 6/1969 | Wright |
| 3,559,604 A | 2/1971 | Ruehleman et al. |
| 3,590,332 A | 6/1971 | Anderson et al. |
| 3,617,814 A | 11/1971 | Stanback |
| 3,628,828 A | 12/1971 | Page et al. |
| 3,631,630 A | 1/1972 | Buffington et al. |
| 3,636,671 A | 1/1972 | Hollister |
| 3,662,429 A | 5/1972 | Johnson et al. |
| 3,675,085 A | 7/1972 | Stanback |
| 3,678,625 A | 7/1972 | Vance |
| 3,678,626 A | 7/1972 | Heikel |
| 3,686,794 A | 8/1972 | Sakamoto et al. |
| 3,707,521 A | 12/1972 | Williams De Santis |
| 3,713,578 A | 1/1973 | Johnson |
| 3,714,127 A | 1/1973 | Fabris et al. |
| 3,724,132 A | 4/1973 | Romberg |
| 3,737,355 A | 6/1973 | Epstein et al. |
| 3,740,897 A | 6/1973 | Johns |
| 3,768,207 A | 10/1973 | Mongelli et al. |
| 3,770,312 A | 11/1973 | Shadburn |
| 3,779,794 A | 12/1973 | De Santis |
| 3,784,243 A | 1/1974 | Pastva, Jr. |
| 3,791,072 A | 2/1974 | Miller |
| 3,791,074 A | 2/1974 | Waffenschmidt |
| 3,806,188 A | 4/1974 | Tantlinger |
| 3,819,560 A | 6/1974 | Kehr |
| 3,825,053 A | 7/1974 | Romberg |
| 3,827,184 A | 8/1974 | Pennee et al. |
| 3,835,585 A | 9/1974 | Anderson et al. |
| 3,837,984 A | 9/1974 | Wagner et al. |
| 3,867,790 A | 2/1975 | Frank |
| 3,874,118 A | 4/1975 | Robinson |
| 3,875,700 A | 4/1975 | Street |
| 3,881,303 A | 5/1975 | Krafka et al. |
| 3,885,072 A | 5/1975 | Zibritosky |
| 3,892,713 A | 7/1975 | Burkus et al. |
| 3,903,567 A | 9/1975 | Suska |
| 3,906,670 A | 9/1975 | Burton |
| 3,908,311 A | 9/1975 | Romberg |
| 3,916,055 A | 10/1975 | Wagner |
| 3,927,727 A | 12/1975 | Hanagan |
| 3,962,827 A | 6/1976 | Chaffee |
| 3,974,753 A | 8/1976 | Blomgren et al. |
| 3,979,364 A | 9/1976 | Rowton |
| 3,990,196 A | 11/1976 | Eddins |
| 4,004,050 A | 1/1977 | Rabito et al. |
| 4,031,049 A | 6/1977 | Hirosawa et al. |
| 4,047,467 A | 9/1977 | Lundin |
| 4,067,605 A | 1/1978 | Green et al. |
| 4,073,093 A | 2/1978 | Ookawa et al. |
| 4,084,347 A | 4/1978 | Brown |
| 4,087,940 A | 5/1978 | Voegele, Jr. |
| 4,093,304 A | 6/1978 | Ziegler |
| 4,095,640 A | 6/1978 | Beckerer, Jr. |
| 4,097,442 A | 6/1978 | Kieft et al. |
| 4,098,024 A | 7/1978 | Naka |
| 4,098,025 A | 7/1978 | Stock et al. |
| 4,099,511 A | 7/1978 | McIntire et al. |
| 4,104,825 A | 8/1978 | Hosmer |
| 4,110,268 A | 8/1978 | Longley et al. |
| 4,115,901 A | 9/1978 | Schmidt |
| 4,115,955 A | 9/1978 | Aldrich |
| 4,116,483 A | 9/1978 | Kramer et al. |
| 4,118,827 A | 10/1978 | Yamamoto |
| 4,118,894 A | 10/1978 | Kennedy et al. |
| 4,120,598 A | 10/1978 | Zernig et al. |
| 4,124,954 A | 11/1978 | Redick |
| 4,126,965 A | 11/1978 | Hoffmann |
| 4,130,966 A | 12/1978 | Kujawa, Jr. et al. |
| 4,132,033 A | 1/1979 | Esposito |
| 4,132,035 A | 1/1979 | Frambach |
| 4,137,669 A | 2/1979 | Nunlist |
| 4,139,234 A | 2/1979 | Morgan |
| 4,167,088 A | 9/1979 | Governale |
| 4,167,259 A | 9/1979 | Bury |
| 4,169,731 A | 10/1979 | Noshiro et al. |
| 4,175,357 A | 11/1979 | Goldhaber |
| 4,177,540 A | 12/1979 | Gorton |
| 4,180,644 A | 12/1979 | Marquis et al. |
| 4,186,460 A | 2/1980 | Artman |
| 4,186,524 A | 2/1980 | Pelchat |
| 4,200,328 A | 4/1980 | Morgan |
| 4,201,411 A | 5/1980 | Morgan |
| 4,216,051 A | 8/1980 | Brown et al. |
| 4,219,230 A | 8/1980 | Lapine |
| 4,223,482 A | 9/1980 | Barroero et al. |
| 4,226,052 A | 10/1980 | DeStepheno |
| 4,243,262 A | 1/1981 | Tokunaga et al. |
| 4,248,489 A | 2/1981 | Barroero et al. |
| 4,255,901 A | 3/1981 | Stenberg |
| 4,263,749 A | 4/1981 | McDougle |
| 4,272,934 A | 6/1981 | Cowden et al. |
| 4,274,901 A | 6/1981 | Elber |
| 4,284,751 A | 8/1981 | Hutt et al. |
| 4,294,498 A | 10/1981 | Van Luit |
| 4,296,961 A | 10/1981 | Hunt et al. |
| 4,300,752 A | 11/1981 | Schultz |
| 4,314,721 A | 2/1982 | Clark |
| 4,320,221 A | 3/1982 | Hoffman |
| 4,328,643 A | 5/1982 | Bell |
| 4,345,607 A | 8/1982 | Contreras et al. |
| 4,350,803 A | 9/1982 | Penn |
| 4,358,011 A | 11/1982 | Buschbom et al. |
| 4,358,151 A | 11/1982 | Wood |
| 4,363,191 A | 12/1982 | Morgan |
| 4,364,214 A | 12/1982 | Morgan et al. |
| 4,364,595 A | 12/1982 | Morgan et al. |
| 4,371,204 A | 2/1983 | George et al. |
| 4,373,294 A | 2/1983 | Kennedy et al. |
| 4,391,065 A | 7/1983 | Rice |
| 4,391,653 A | 7/1983 | Takechi et al. |
| 4,392,330 A | 7/1983 | Buhr |
| 4,396,221 A | 8/1983 | Morgan et al. |
| 4,403,452 A | 9/1983 | Urbanick |
| 4,405,173 A | 9/1983 | Piano |
| 4,406,087 A | 9/1983 | Asaka et al. |
| 4,414,052 A | 11/1983 | Habata et al. |
| 4,422,688 A | 12/1983 | Kameoka |
| 4,431,790 A | 2/1984 | Umeda et al. |
| 4,433,866 A | 2/1984 | Hagiwara |
| 4,433,930 A | 2/1984 | Cosenza |
| 4,438,609 A | 3/1984 | Nielson et al. |
| 4,438,993 A | 3/1984 | Rabas |
| 4,443,973 A | 4/1984 | Naka |
| 4,444,976 A | 4/1984 | Rabito |
| 4,447,985 A | 5/1984 | Weber et al. |
| 4,457,111 A | 7/1984 | Koike |
| 4,469,370 A | 9/1984 | Petersen |
| 4,478,005 A | 10/1984 | Mundschenk |
| 4,483,102 A | 11/1984 | Edwards |
| 4,484,773 A | 11/1984 | Lehne |

| | | | | | | |
|---|---|---|---|---|---|---|
| 4,489,127 A | | 12/1984 | Gutek et al. | 4,850,142 A | 7/1989 | Sasamura et al. |
| 4,495,731 A | | 1/1985 | Sears | 4,861,540 A | 8/1989 | Nieboer et al. |
| 4,500,606 A | | 2/1985 | Rabito et al. | 4,864,689 A | 9/1989 | Brockhaus |
| 4,502,249 A | | 3/1985 | Banford | 4,876,132 A * | 10/1989 | Kunert |
| 4,511,129 A | | 4/1985 | Kishino | 4,876,952 A | 10/1989 | Kuno et al. |
| 4,511,626 A | | 4/1985 | Schumacher | 4,878,314 A | 11/1989 | Blockinger |
| 4,512,124 A | | 4/1985 | Banford | 4,879,853 A | 11/1989 | Braendle et al. |
| 4,534,587 A | | 8/1985 | Fleming | 4,881,773 A | 11/1989 | Ichinose |
| 4,538,379 A | | 9/1985 | Vargo | 4,894,972 A | 1/1990 | Endoh et al. |
| 4,539,345 A | | 9/1985 | Hansen | 4,903,455 A | 2/1990 | Veazey |
| 4,543,755 A | | 10/1985 | Crandell | 4,907,667 A | 3/1990 | Yamamoto et al. |
| 4,544,171 A | | 10/1985 | Kellogg | 4,909,869 A | 3/1990 | Sakamoto et al. |
| 4,545,522 A | | 10/1985 | Kerzner | 4,910,071 A * | 3/1990 | Kunert |
| 4,553,360 A | | 11/1985 | Colombo | 4,918,865 A | 4/1990 | Hirai |
| 4,555,867 A | | 12/1985 | Stibolt | 4,918,866 A | 4/1990 | Pastva |
| 4,561,223 A | | 12/1985 | Gold et al. | 4,922,660 A | 5/1990 | Omelchuk |
| 4,562,668 A | | 1/1986 | Karhu et al. | 4,923,232 A | 5/1990 | Kawagoe et al. |
| 4,566,222 A | | 1/1986 | Hatvany | 4,923,756 A | 5/1990 | Chung et al. |
| 4,572,872 A | | 2/1986 | Yamazaki et al. | 4,925,237 A | 5/1990 | Böhn et al. |
| 4,573,287 A | | 3/1986 | Hagemeyer et al. | 4,927,207 A | 5/1990 | Kishino |
| 4,576,670 A | | 3/1986 | Schade et al. | 4,933,032 A * | 6/1990 | Kunert |
| 4,582,738 A | | 4/1986 | Kunert | 4,948,206 A | 8/1990 | Fitzpatrick |
| 4,606,159 A | | 8/1986 | Kunert | 4,950,715 A | 8/1990 | Duck et al. |
| 4,608,780 A | | 9/1986 | Van Noy | 4,951,907 A | 8/1990 | Gold |
| 4,610,109 A | | 9/1986 | Ruigrok | 4,954,199 A | 9/1990 | Rains et al. |
| 4,618,067 A | | 10/1986 | Cohn et al. | 4,955,659 A | 9/1990 | Kosugi |
| 4,618,176 A | | 10/1986 | Farmont | 4,956,954 A | 9/1990 | Horgan, Jr. |
| 4,621,469 A | | 11/1986 | Kruschwitz | 4,962,615 A | 10/1990 | Birdling |
| 4,623,738 A | | 11/1986 | Sugerman et al. | 4,963,220 A | 10/1990 | Bachmann et al. |
| 4,625,459 A | | 12/1986 | Warner | 4,963,636 A | 10/1990 | Mulhaupt et al. |
| 4,626,475 A | | 12/1986 | Goel et al. | 4,979,264 A | 12/1990 | Ramsauer |
| 4,629,265 A | | 12/1986 | Chester | 4,985,535 A | 1/1991 | Takada et al. |
| 4,635,415 A * | | 1/1987 | Schumacher et al. | 4,986,595 A | 1/1991 | Gold |
| 4,638,596 A | | 1/1987 | Gallardo | 4,987,699 A | 1/1991 | Gold |
| 4,643,794 A | | 2/1987 | Saracsan et al. | 4,994,315 A | 2/1991 | Schreiber et al. |
| 4,651,382 A | | 3/1987 | Krolick | 4,994,540 A | 2/1991 | Boerner et al. |
| 4,672,100 A | | 6/1987 | Schönbächler et al. | 4,995,666 A * | 2/1991 | Schurmann ................. 296/216 |
| 4,684,167 A | | 8/1987 | Newmayer | 4,998,612 A | 3/1991 | Halsey et al. |
| 4,697,841 A | | 10/1987 | Klein et al. | 5,002,806 A | 3/1991 | Chung |
| 4,700,525 A | | 10/1987 | Nieboer et al. | 5,008,311 A | 4/1991 | Janoski |
| 4,704,970 A | | 11/1987 | Sanderson et al. | 5,016,721 A | 5/1991 | Yamamoto et al. |
| 4,712,341 A | | 12/1987 | Harris, Jr. et al. | 5,023,668 A | 6/1991 | Kluy et al. |
| 4,723,809 A | | 2/1988 | Kida et al. | 5,028,082 A | 7/1991 | Kronbetter |
| 4,727,702 A | | 3/1988 | Baker et al. | 5,035,082 A | 7/1991 | Butler |
| 4,743,672 A * | | 5/1988 | Goel ........................... 528/44 | 5,035,084 A | 7/1991 | Towns |
| 4,749,120 A | | 6/1988 | Hatada | 5,042,871 A | 8/1991 | Gotanda et al. |
| 4,755,251 A | | 7/1988 | Cline et al. | 5,046,284 A | 9/1991 | Harper |
| 4,761,916 A | | 8/1988 | Sanok et al. | 5,050,928 A | 9/1991 | Böhm et al. |
| 4,762,904 A | | 8/1988 | Nakama | 5,062,248 A | 11/1991 | Kunert |
| 4,775,570 A | | 10/1988 | Ohlenforst et al. | 5,063,638 A | 11/1991 | Howard et al. |
| 4,776,132 A | | 10/1988 | Gold | 5,064,494 A | 11/1991 | Duck et al. |
| 4,777,699 A | | 10/1988 | Hill et al. | 5,069,512 A | 12/1991 | Sykes |
| 4,778,702 A | | 10/1988 | Hutter, III | 5,072,984 A * | 12/1991 | Jackson ....................... 296/56 |
| 4,778,845 A | | 10/1988 | Tschan et al. | 5,076,637 A | 12/1991 | Larkin et al. |
| 4,785,499 A | | 11/1988 | Giuffrida et al. | 5,082,736 A | 1/1992 | Bravet et al. |
| 4,793,098 A | | 12/1988 | Wilkerson | 5,085,021 A | 2/1992 | Kunert |
| 4,793,099 A * | | 12/1988 | Friese et al. ................. 49/380 | 5,092,492 A | 3/1992 | Centea |
| 4,793,886 A | | 12/1988 | Okamura et al. | 5,096,255 A | 3/1992 | Leischner |
| 4,799,344 A | | 1/1989 | Francis | 5,112,877 A | 5/1992 | Barker et al. |
| 4,799,730 A | | 1/1989 | Harasaki | 5,121,824 A | 6/1992 | Halsey et al. |
| 4,809,425 A | | 3/1989 | Monforte | 5,125,207 A | 6/1992 | Strobl, Jr. et al. |
| 4,810,025 A | | 3/1989 | Riley | 5,125,716 A | 6/1992 | Smith et al. |
| 4,811,532 A | | 3/1989 | Fratti et al. | 5,131,349 A | 7/1992 | Keller et al. |
| 4,813,182 A | | 3/1989 | Daniels et al. | 5,136,812 A | 8/1992 | Voegele |
| 4,817,585 A | | 4/1989 | Craver | 5,137,770 A | 8/1992 | Rothe et al. |
| 4,820,810 A | | 4/1989 | Klein et al. | 5,140,771 A | 8/1992 | Moy et al. |
| 4,822,656 A | | 4/1989 | Hutter, III | 5,143,996 A | 9/1992 | Chung et al. |
| 4,826,239 A | | 5/1989 | Nishikawa et al. | 5,147,927 A | 9/1992 | Baghdachi et al. |
| 4,828,315 A | | 5/1989 | Muirhead | 5,150,943 A | 9/1992 | Gold |
| 4,839,122 A | | 6/1989 | Weaver | 5,154,028 A | 10/1992 | Hill et al. |
| 4,841,698 A | | 6/1989 | Gold | 5,161,419 A | 11/1992 | Moy et al. |

| Patent Number | Date | Inventor |
|---|---|---|
| 5,171,818 A | 12/1992 | Wilson |
| 5,185,402 A | 2/1993 | Fleming et al. |
| 5,187,837 A | 2/1993 | Gunderson et al. |
| 5,187,897 A | 2/1993 | Maidment |
| 5,193,308 A | 3/1993 | Davidian |
| 5,199,218 A | 4/1993 | McQuade |
| 5,201,822 A | 4/1993 | Chen |
| 5,205,072 A | 4/1993 | Eutebach |
| 5,206,331 A | 4/1993 | Tsuno et al. |
| 5,207,036 A | 5/1993 | Sampson et al. |
| 5,212,907 A | 5/1993 | Van Sandt |
| 5,214,877 A | 6/1993 | Kaspar et al. |
| 5,214,878 A | 6/1993 | Watt |
| 5,227,409 A | 7/1993 | Mobley et al. |
| 5,231,948 A | 8/1993 | Malmanger et al. |
| 5,232,532 A | 8/1993 | Hori |
| 5,238,264 A | 8/1993 | Barnes |
| 5,239,406 A | 8/1993 | Lynam et al. |
| 5,242,518 A | 9/1993 | Riederer |
| 5,261,721 A | 11/1993 | Conger et al. |
| 5,274,881 A | 1/1994 | DeRosa |
| 5,279,882 A | 1/1994 | Daude et al. |
| 5,291,710 A | 3/1994 | Golen |
| 5,294,168 A | 3/1994 | Kronbetter |
| 5,299,616 A | 4/1994 | Sholtz |
| 5,302,333 A | 4/1994 | Capriotti et al. |
| 5,304,623 A | 4/1994 | Ito et al. |
| 5,310,796 A | 5/1994 | Warren et al. |
| 5,327,682 A | 7/1994 | Holtz |
| 5,338,767 A | 8/1994 | Sartelet et al. |
| 5,342,867 A | 8/1994 | Ryan et al. |
| 5,342,873 A | 8/1994 | Merz et al. |
| 5,349,040 A | 9/1994 | Trinks et al. |
| 5,355,625 A | 10/1994 | Matsuoka |
| 5,355,627 A | 10/1994 | Katz |
| 5,367,036 A | 11/1994 | Saito et al. |
| 5,368,378 A | 11/1994 | Curtis |
| 5,385,061 A | 1/1995 | Moy et al. |
| 5,385,383 A | 1/1995 | Kreis et al. |
| 5,388,372 A | 2/1995 | Zanoni |
| 5,388,424 A | 2/1995 | Chopko et al. |
| 5,392,565 A | 2/1995 | Rentschler |
| 5,394,649 A | 3/1995 | Lindgren et al. |
| 5,401,453 A | 3/1995 | Moretz et al. |
| 5,413,317 A | 5/1995 | Spoerre |
| 5,413,397 A | 5/1995 | Gold |
| 5,419,085 A | 5/1995 | Imbur |
| 5,421,124 A | 6/1995 | Zuccaro |
| 5,426,897 A | 6/1995 | Gazaway |
| 5,428,925 A | 7/1995 | Snyder |
| 5,428,968 A | 7/1995 | Tetsukawa et al. |
| 5,430,982 A | 7/1995 | Bane |
| 5,457,913 A | 10/1995 | Gold |
| 5,459,185 A | 10/1995 | Nakata et al. |
| 5,473,842 A | 12/1995 | Hillery |
| 5,475,956 A | 12/1995 | Agrawal et al. |
| 5,476,626 A | 12/1995 | Miyama et al. |
| 5,483,771 A | 1/1996 | Herbst |
| 5,492,951 A | 2/1996 | Beyrle et al. |
| 5,508,111 A | 4/1996 | Schmucker |
| 5,523,877 A | 6/1996 | Lynam |
| 5,529,655 A * | 6/1996 | Bravet et al. ............ 156/244.17 |
| 5,544,458 A | 8/1996 | Fisher et al. |
| 5,548,056 A | 8/1996 | Chung |
| 5,551,197 A | 9/1996 | Repp et al. |
| 5,567,530 A | 10/1996 | Drujon et al. |
| 5,631,318 A | 5/1997 | Ito et al. |
| 5,680,245 A | 10/1997 | Lynam |
| 5,680,728 A | 10/1997 | Moy |
| 5,704,173 A | 1/1998 | Repp et al. |
| 5,707,473 A | 1/1998 | Agrawal et al. |
| 5,723,205 A | 3/1998 | Millette et al. |
| 5,744,557 A | 4/1998 | McCormick et al. |
| 5,747,581 A | 5/1998 | Proebster et al. |
| 5,763,011 A | 6/1998 | Miyama et al. |
| 5,853,895 A | 12/1998 | Lewno |
| 5,864,419 A | 1/1999 | Lynam |
| 5,966,874 A | 10/1999 | Repp et al. |
| 5,986,797 A | 11/1999 | Lynam |
| 6,054,001 A | 4/2000 | Swanson et al. |
| 6,068,719 A | 5/2000 | Lewno |
| 6,122,093 A | 9/2000 | Lynam |
| 6,128,860 A | 10/2000 | Repp et al. |
| 6,203,639 B1 | 3/2001 | Swanson et al. |
| 6,298,606 B1 | 10/2001 | Repp et al. |
| 6,319,344 B1 | 11/2001 | Lewno |
| 6,521,083 B1 | 2/2003 | Swanson et al. |
| 6,599,386 B2 | 7/2003 | Swanson et al. |
| 6,819,467 B2 | 11/2004 | Lynam |
| 6,846,039 B2 | 1/2005 | Lewno |
| 6,871,450 B2 | 3/2005 | Repp et al. |
| 6,926,949 B1 | 8/2005 | Halg et al. |
| 7,332,225 B2 | 2/2008 | Lewno |
| 7,360,338 B2 | 4/2008 | Repp et al. |
| 2005/0121942 A1 | 6/2005 | Repp |
| 2008/0156415 A1 | 7/2008 | Repp et al. |
| 2008/0196816 A1 | 8/2008 | Lewno |

FOREIGN PATENT DOCUMENTS

| | | |
|---|---|---|
| DE | 3246396 | 6/1984 |
| DE | 3409903 A1 | 10/1984 |
| DE | 3404693 | 9/1985 |
| DE | 3419893 A1 | 11/1985 |
| DE | 3501490 A1 | 7/1986 |
| DE | 3509531 | 12/1986 |
| DE | 3624621 A1 | 4/1987 |
| DE | 3624621 | 4/1987 |
| DE | 3643472 A1 | 12/1987 |
| DE | 3727413 | 2/1988 |
| DE | 3641363 | 6/1988 |
| DE | 3832178 A1 | 4/1990 |
| DE | 3925804 | 8/1990 |
| DE | 4002514 A1 | 8/1990 |
| DE | 4113816 | 11/1991 |
| DE | 4129492 | 1/1993 |
| EP | 0096128 A1 | 12/1983 |
| EP | 0096129 A1 | 12/1983 |
| EP | 0109659 A2 | 5/1984 |
| EP | 0128086 A2 | 12/1984 |
| EP | 0219903 A1 | 4/1987 |
| EP | 289156 A1 | 11/1988 |
| EP | 0298788 | 1/1989 |
| EP | 0307316 A2 | 3/1989 |
| EP | 0345134 A2 | 12/1989 |
| EP | 0352151 | 1/1990 |
| EP | 0368728 A2 | 5/1990 |
| EP | 0385924 | 9/1990 |
| EP | 0400291 A1 | 12/1990 |
| EP | 0418123 | 3/1991 |
| EP | 0488878 | 6/1992 |
| EP | 0 488 878 | 6/1992 |
| EP | 0494824 | 7/1992 |
| EP | 526327 A1 | 2/1993 |
| EP | 0542673 A1 | 5/1993 |
| EP | 0576179 | 12/1993 |
| EP | 0576180 A1 | 12/1993 |
| EP | 650768 | 5/1995 |
| GB | 1215267 | 12/1970 |
| GB | 1235056 | 6/1971 |
| GB | 1452812 | 10/1976 |
| GB | 2001700 A | 2/1979 |
| GB | 1573354 | 8/1980 |

| | | |
|---|---|---|
| GB | 2048356 A | 12/1980 |
| GB | 2174746 A | 11/1986 |
| GB | 2215717 A | 9/1989 |
| JP | 47-11057 | 4/1972 |
| JP | 46-95369 | 6/1972 |
| JP | 47-36332 | 11/1972 |
| JP | 49-47624 | 5/1974 |
| JP | 58-47533 | 3/1983 |
| JP | 61-266337 | 11/1986 |
| JP | 62-278035 | 2/1987 |
| JP | 63060131 | 3/1988 |
| JP | 64-45520 U | 2/1989 |
| JP | S64-45520 U | 3/1989 |
| JP | 1122722 | 5/1989 |
| JP | H2258844 | 10/1990 |
| JP | H370626 | 3/1991 |
| JP | 3070626 | 3/1991 |
| JP | 3236922 | 10/1991 |
| WO | WO 95/02621 | 1/1995 |

OTHER PUBLICATIONS

S.J. Monte et al., Application of Titanate Coupling Agents in Mineral and Glass Fiber Filled Rim Urethane Systems, Journal of Elastomers and Plastics (Feb. 1982).
S.J. Monte et al., The Use of Titanate Coupling Agents in Urethanes, Journal of Cellular Plastics, (Mar./Apr. 1983).
Skeist Ph.D., Irving, Handbook of Adhesives, Consultant to the Polymer Industries, Skeist Inc., (1990).
1996 Dodge Caravan brochure.
1994 Mercury Villager brochure.
SAE Technical Paper 900519, Feb. 26, 1990.
SAE Technical Paper 910758, Feb. 25, 1991.
European Search Report of corresponding European patent application No. 94307205.8.
Bonding with Epoxy Elastomeric Adhesives System, Glass to Metal Military Specification B–48612, Sep. 1, 1997.
L. Kertesz, Hopeful: GM Tarrytown Workers Approve Part in Bid To Win Production of Minivan, Automotive News, Crain Communications, Inc. Jan. 19, 1987.
J. Dunne, Inside Detroit—GM's 1990 FWD Minivan, Popular Mechanics, May 1987.
Ashland Chemical's Pliogrip 6600 Urethane Adhesive, Technical Data, Jul. 1986.
Chrysler Corporation Material Standard, Structural Adhesive—Steel to Tempered Glass, MSCD618<S> Change: D, May 8, 1995.
Chrysler Corporation Process Standard, Bonding of Steel Channel to Tempered Glass With a Structural Adhesive, No. PS–6764<S> Change: C, Jun. 3, 1997.
Betaseal 43518 Clear Glass Primer Process Standard, Dow Automotive, Oct. 15, 1999.
Ashland Chemicals Pliogrip 6620, Technical Data, Oct. 1986.
Ashland Chemicals Pliogrip 6036 Wash Primer, Technical Data, Nov. 1986.
Ashland Pliogrip Adhesive Systems, 8200 Primer, Infotech Product Literature, 2000.
BetaSeal 43520A Blackout Glass Primer Process Standard, Dow Automotive, Oct. 17, 2001.
Dupont Rynite Thermoplastic Polyester Resin Product Information, Apr. 1, 1989.
Tyrite 7500 Urethane Adhesive System, DS10–3603B, Lord Industrial Adhesives Product Information, 1984.
Double Coated Industrial Tapes Reference Guide, 3M Industrial Tape and Specialties Division, 70–0702–0266–1 (104.5)R1, 1994.
Material Safety Data Sheet etamate (R) 43518 Glass Primer, Essex Specialty Products, Inc., Aug. 2, 1993.
Scotch–Weld Adhesive 642/6 mil, Automotive Technical Data Sheet, 3M Automotive Systems Division, Jun. 20, 1987.
I. Houston, K. Dowing and K. Mack, General Motors—The Glue Line—Why How and When, SAE Mar. 13, 1961.
R. Murray and L. Marlin, The Present and Future Status of Hot Melt Adhesives in the Automotive Industry, 700070, SAE, Jan. 12, 1970.
K. Habeeb, The Present and Future Uses of Reactive Type Adhesive, 700071, SAE, Jan. 12, 1970.
D. Weyher, Adhesives Used in Automotive Production, 71016, SAE, Jan. 11, 1971.
R. H. Beck and D.A. Yurek, Automotive Structural Bonding, 750077, SAE, Feb. 24, 1975.
G. Schneberger, Automotive Adhesives—Why, How, What, Where, 780191, SAE, Feb. 27, 1978.
G. Schneberger, Automotive Adhesives—Past, Present and Future, 800210, SAE, Feb. 25, 1980.
W.A. Pletcher, Bonding of Automotive Plastics—Technology and Applications, 810767, SAE, Jun. 8, 1981.
E. Plueddemann, Bonding to Metals, AD90–125, SAE, Nov. 1989.
M. Kimball, Reactive Hot Melt Adhesives for Automotive Bonding, AD90–126, SAE, Nov. 1989.
K. Schroeder and K. Drain, New Developments in Structural Adhesives, AD90–127,SAE, Nov. 1989.
Bonding and Coating Plastics in the Automotive Industry, EuroTrends, Nov. 1990.
G. Maciver, The State of Polyurethane Structural Adhesive Technology in the Transporation Industry, 910386, SAE, Feb. 25, 1991.
J. Cocoo, L. Moffa, D. Callanan, The Role of Design for Manufacturing and Adhesives in Solving Design Challenges, 910504, SAE. Feb. 25, 1991.
R. Agrawal, A. Agrawal and J. Thomas, Developments in Modular Windows For Automotive Applications, 910759, SAE, Feb. 25, 1991.
H. Kunert and G. Cornils, Advanced Concepts for Modular Glazings, 9202901, SAE, Feb. 24, 1992.
J. Shields, Adhesives Handbook, Third Edition, Butterworth & Co., 1985.
A. Pocius, Third Generation Two–Part Epoxy Adhesives, 19th Int'l Sample Technical Conference, Oct. 1987.
E. Sydor, Bonding of Structural Adhesives, National Automotive Week Paper, SAE, Mar. 1961.
A. Pizzi and K. L. Mittal, Handbook of Adhesive Technology, Marcel Dekker Inc., 1994.
A. J. Kinloch, Adhesion and Adhesives, Science and Technology, Chapman and Hall, 1987.
I. Johns, Adhesion Fundamentals, Industrial Adhesives and Sealants Seminar, Australasia Technical Papers, Lecture No. 1, SAE, Dec. 1979.
A. Goel, New Hybrid Structural Adhesive for Reinforced Plastics, Composites Institute, SPI, Feb. 1987.
"Loctite Technology—A Catalog of Adhesive and Sealant Solutions," Loctite Corporation Industrial Group, Newington, Connecticut, Sep. 1990 (62 pages).
"Designer's Reference Guide to High–Performance Bonding Tapes for Product Design and Assembly," 3M—Industrial Specialties Division, St. Paul, Minnesota, 1991 (24 pages).

"How to Bond Plastics," Loctite Corporation, North America Group, Newington, Connecticut, Oct. 1992 (36 pages).

Charles E. Rogers, "Durability of Structural Adhesives," Adhesive Bonding Advance Technology/Update—1993, Oct. 19–21, 1993, Univ. of Wis. Ctr for Cont. Ed., (51 pages).

"Replacing Mechanical Fasteners for Advanced Product Assembly . . . Very–High–Bond Scott™ VHB™ Tapes," 3M—Industrial Tape and Specialties Division, St. Paul, MN, 1993 (8 pages).

Robert D. Anderson, "PSA Technology and Applications Adhesive Bonding Advanced Technology—Update 1993" 3M—Industrial Tape and Specialties Division, 1993 (17 pages).

"How to Bond Plastics—The Better Way to Hold Parts Together," Loctite Corporation, Newington, Connecticut, Nov. 1988 (8 pages).

GM Stationary Glass Bonding Adhesive System Performance Requirements, GM3652M, Jun. 1992, 2 pages.

GM Zinc Coated Steel Sheet and Strip, Hot Dip Galvanized, GM6185M, Aug. 1993, 2 pages.

GM Performance of Substrates And/Or Coatings Through Environmental Cycling, GM9505P, Jul. 1988, 4 pages.

GM Knife Quick Adhesion Test For Stationary Glass Bonding Materials To Paint, GM9522P, Jan. 1992, 1 page.

GM Adhesion and Durability Of Exterior Trims, GM9758P, Nov. 1988, 3 pages.

GM Adhesion and Durability Of Bonded Weatherstrip–Pressure Sensitive Adhesive, GM9795P, Mar. 1990, 3 pages.

GM Cleavage Peel Test, GM9797P, Nov. 1988, 3 pages.

GM Electrodeposition Primer–Cathodic ELPO For Small Parts, 9984120, 1993, 1 page.

GM Adhesive, Twopart, Urethane, FRP, 9985454, Jun. 1992, 3 pages.

GM Adhesive, Two–Part, Polyurethane, Structural 9985786, Apr. 1992, 2 pages.

GM Adhesive, Two–Part, Polyurethane, Structural 9985787, Apr. 1992, 1 page.

GM Adhesive, Two–Part, Polyurethane, Structural 9985788, Apr. 1992, 2 pages.

Toyota Technical Instruction Sheet No. 01 204–01033, Apr. 21, 1992, 11 pages.

Toyota One–Comonent Urethane Adhesives For Glass Sub–Assembly Parts, TSK5515G, Jun. 1991, 21 pages.

Toyota Polyvinyl Chloride Materials For Stainless Steel Molding, TSM7607G, Oct. 1990, 18 pages.

Vista Suggested Processing Conditions for Vista Flexible PVC Compounds, 1992, 4 pages.

Ashland Chemicals, Pliogrip Adhesive Systems for Structural Bonding, 1986, 16 pages.

Chrysler Environmental, Health, and Occupational Safety Requirements For Regulated Substances Or Processes And Vehicle Recycling Reporting Requirements, CS–9003, Change B, Apr. 1993, 17 pages.

Chrysler Primer–Adhesion Promoter–Polyurethane Adhesive To Glass, MS–CF121, Change A, Jul. 1972, 4 pages.

Chrysler Adhesive–Sealer Polyurethane Base–Room Temperature Moisture Curing Glass To Body Opening Applications, MS–CD910, Change A, Jul. 1972, 4 pages.

Chrysler Adhesive–Sealer–Polyurethane Base–Room Temperature Curing Windshield and Backlight Applications, MS–CD917, Change A, Jun. 1990, 10 pages.

Chrysler Glass–Safety–Heat Treated, MS–3694, Change T, Jun. 1990, 13 pages.

Chrysler Performance of Injection Molded TPU to Single Side of Fritted Tempered Glass, Apr. 1993, 3 pages.

Chrysler Tolerance Control Of Window Glass Parts And Glass–And–Frame Assemblies, PS–4468, Change B, Sep. 1981, 13 pages.

Chrysler Electrically Heated Backlight, PF–6071, Change C, Sep. 1981, 7 pages.

Chrysler Glass Assembly Using Urethane Adhesive, No. PF–, Apr. 1993, 7 pages.

Chrysler Bonding Of Windshield And Backlites To Body Opening With Adhesive/Sealer Polyurethane Base–Room Temperature Curing, PS–7103, Change E, Apr. 1993, 7 pages.

Chrysler Modular Window Aid And Water Leak Test, PS–8461, Feb. 1987, 3 pages.

Material Safety Data Sheet for 435.20 primer, dated Aug. 14, 1985, 2 pages.

Kurt Devries, Analysis of Adhesive Tensile Test Methods, Polymer Engineering & Science, Jul. 1986, vol. 26, No. 13, pp. 962–968.

Brian R. Suddaby, Michael J. Short, and Thomas N. Thompson, SAE Technical Paper Series, Improvements in RIM Encapsulated Windows, Feb. 26–Mar. 2, 1990, 8 pages.

Anil B. Goel, New Hybrid Structural Adhesive for Reinforced Plastics, Feb. 2–6, 1987, 7 pages.

Gurit Essex AG Beta Seal Betamate document, Jun. 1988, 136 pages.

G. Sauer, Innovationen auf dem Glassektor, 1988, 7 pages.

H. Kunert, Glasherstelung im Wandel der Technik, date unknown, 5 pages.

K.H. Bruck, Fahrzeug–Verglasung, 1990, 8 pages.

Adhesives, D.A.T.A. Digest, 1991, 237 pages.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–51 is confirmed.

* * * * *